United States Patent
Terai

(10) Patent No.: US 12,128,741 B2
(45) Date of Patent: Oct. 29, 2024

(54) AIR CONDITIONING FUNCTION-EQUIPPED CONSOLE DEVICE AND AIR CONDITIONING DUCT DEVICE

(71) Applicant: TOYODA GOSEI CO., LTD., Kiyosu (JP)

(72) Inventor: Nobuhiro Terai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 54 days.

(21) Appl. No.: 17/704,240

(22) Filed: Mar. 25, 2022

(65) Prior Publication Data

US 2022/0314748 A1 Oct. 6, 2022

(30) Foreign Application Priority Data

Apr. 1, 2021 (JP) .................................. 2021-063089
Jun. 28, 2021 (JP) .................................. 2021-106463

(51) Int. Cl.
| | | |
|---|---|---|
| B60H 1/34 | (2006.01) | |
| B60H 1/00 | (2006.01) | |
| B60H 1/24 | (2006.01) | |

(52) U.S. Cl.
CPC ....... B60H 1/3421 (2013.01); B60H 1/00678 (2013.01); B60H 1/246 (2013.01)

(58) Field of Classification Search
CPC ... B60H 1/3421; B60H 1/00678; B60H 1/246
(Continued)

(56) References Cited

U.S. PATENT DOCUMENTS 4,633,770 A * 1/1987 Taylor .................... F24F 13/08
454/316
5,643,080 A 7/1997 Kondoh et al.
(Continued)

FOREIGN PATENT DOCUMENTS

| JP | S58-43510 U | 3/1983 |
|---|---|---|
| JP | H08-175156 A | 7/1996 |

(Continued)

OTHER PUBLICATIONS

Office Action dated Dec. 12, 2023 issued for corresponding Japanese Patent Application No. 2021-063089 (and English machine translation).

(Continued)

*Primary Examiner* — Avinash A Savani
*Assistant Examiner* — Dana K Tighe
(74) *Attorney, Agent, or Firm* — Posz Law Group, PLC

(57) ABSTRACT

A duct body F30 having a straight tubular shape is provided to a duct F3 of an air conditioning function-equipped console device F1, a fin member F35 provided inside the duct body F30 faces a front blowout port F33 of the duct body F30, fin bodies F36 of the fin member F35 are arranged in an axial direction of the duct body F30, and projected areas of the respective fin bodies F36 when projected in the axial direction increase from the fin body F36 on an inflow port F31 side toward the fin body F36 on a rear blowout port F32 side. Alternatively, a damper S4 is disposed on a far side of a blowout port S2 of a duct S3 in an air conditioning duct device S1, an operation portion S5 connected to the damper S4 and partially exposed in a vehicle compartment S95 is provided, the blowout port S2 has a long shape, and at least a part of the operation portion S5 is located on an outer side in a short-side direction with respect to the blowout port S2.

4 Claims, 8 Drawing Sheets

(58) Field of Classification Search
USPC .......................................... 454/144, 155, 244
See application file for complete search history.

(56) References Cited

U.S. PATENT DOCUMENTS

| | | | | |
|---|---|---|---|---|
| 6,123,377 | A * | 9/2000 | Lecher | B60K 37/00 |
| | | | | 180/315 |
| 6,152,522 | A * | 11/2000 | Boulay | B60H 1/247 |
| | | | | 296/37.14 |
| 9,776,572 | B2 | 10/2017 | Mizobata et al. | |
| 2007/0184770 | A1 * | 8/2007 | Shibata | B60H 1/00564 |
| | | | | 454/69 |
| 2008/0248736 | A1 * | 10/2008 | Aoki | B60H 1/00742 |
| | | | | 454/75 |
| 2012/0088444 | A1 * | 4/2012 | Wittorf | B60H 1/00564 |
| | | | | 454/142 |
| 2017/0080871 | A1 | 3/2017 | Mizobata et al. | |

FOREIGN PATENT DOCUMENTS

| | | | |
|---|---|---|---|
| JP | 2002-321524 | A | 11/2002 |
| JP | 2015-101181 | A | 6/2015 |
| JP | 2017-56917 | A | 3/2017 |
| JP | 2020-200007 | A | 12/2020 |

OTHER PUBLICATIONS

Notification of Reasons for Refusal mailed Feb. 20, 2024 issued in corresponding Japanese Patent Application No. 2021-106463 (and English machine translation).

* cited by examiner

AIR CONDITIONING FUNCTION-EQUIPPED CONSOLE DEVICE AND AIR CONDITIONING DUCT DEVICE

TECHNICAL FIELD

The present invention relates to an air conditioning function-equipped console device having an air conditioning function for heating and cooling a vehicle compartment, and an air conditioning duct device connected to a vehicle air conditioner for heating and cooling a vehicle compartment.

BACKGROUND ART

A typical vehicle is equipped with an air conditioning system for performing heating and cooling.

In an engine vehicle which uses petroleum fuel such as gasoline as a power source and an engine as a prime mover, using exhaust heat during combustion of petroleum fuel as a heat source for heating in an air conditioning system is common.

As a part of the above air conditioning system, a typical vehicle is equipped with a vehicle air conditioner which produces conditioned air for heating and cooling. An air conditioning duct device for supplying the conditioned air produced by the vehicle air conditioner to a vehicle compartment is connected to the vehicle air conditioner.

Electric vehicles, which have remarkably emerged in recent years, use automobile batteries such as lithium-ion secondary batteries as a power source. Since electric vehicles do not burn petroleum fuel, electric vehicles are advantageous in terms of reduction of $CO_2$ emissions, etc., as compared to the above-described engine vehicles.

However, on the other hand, electric vehicles cannot utilize exhaust heat during combustion of petroleum fuel.

Therefore, in an air conditioning system mounted on an electric vehicle, using an automobile battery, which is a power source of an electric motor, as a power source of an electric heater is also common. However, when the same automobile battery is used as the power sources for the electric motor for running and the electric heater for heating, for example, if the amount of energy required for heating is large such as in a severe cold season, there is a problem that the travelable distance of the vehicle is shortened by consuming a large amount of energy for the air conditioning system. In this respect, electric vehicles are considered to be disadvantageous as compared to engine vehicles. The same applies to hybrid vehicles which use both an engine and an electric motor.

In recent years, a technology has been proposed in which air-conditioning is performed only on a target portion of a vehicle compartment instead of performing air-conditioning on the entire vehicle compartment.

JP2017-56917 (A) discloses a technology in which, in a console device which is disposed on a lateral side of a seat in a vehicle, a gap for blowing out conditioned air to an occupant sitting on the seat is provided between the upper end side of a side surface portion of a console box and a side end portion of a lid body.

When air-conditioning is performed only on a portion close to an occupant in a vehicle compartment as described above, there is a possibility that the amount of energy used is reduced as compared to the case of performing air-conditioning on the entire vehicle compartment.

Hereinafter, in the present specification, the technology for performing air-conditioning on a portion close to an occupant in a vehicle compartment as described above is sometimes referred to as proximity air-conditioning. In addition, the technology for performing air-conditioning over a wide range in a vehicle compartment is sometimes referred to as general air-conditioning.

SUMMARY OF INVENTION

Technical Problem

Meanwhile, as described above, proximity air-conditioning is considered to be useful for realizing energy saving of an air conditioning system and a vehicle, and performing air-conditioning on a vehicle compartment such that occupants spend time comfortably. However, in actuality, sufficiently performing air-conditioning on the vehicle compartment only with proximity air-conditioning may be difficult.

For example, when the number of occupants is large, if air-conditioning is performed only on a partial region of a vehicle compartment with proximity air-conditioning, an occupant who is present in a region on which air-conditioning is not performed may feel uncomfortable. From this point of view, an air conditioning system that performs only proximity air-conditioning is considered to be not sufficient as a vehicle air conditioning system.

JP2017-56917 (A) discloses an example in which both proximity air-conditioning and general air-conditioning are performed, as an example. The example of JP2017-56917 (A) indicates that a flow path for general air-conditioning is formed between an outer panel and an inner panel of a console box, a supply hole is provided on the flow path, and conditioned air flowing through the flow path is supplied through the supply hole to a blowout port (gap 27) for proximity air-conditioning.

JP2017-56917 (A) also discloses providing a duct (dedicated duct 34) for proximity air-conditioning in addition to the flow path for general air-conditioning as another example.

According to the technology of JP2017-56917 (A), performing proximity air-conditioning and general air-conditioning at the same time is possible.

However, on the other hand, according to this technology, the flow path for general air-conditioning is also used as a flow path for proximity air-conditioning, so that conditioned air is not sufficiently supplied to the flow path for proximity air-conditioning in some cases. In addition, in the technology of JP2017-56917 (A), the blowout port for proximity air-conditioning has an elongated slit shape extending along the flow path of the conditioned air. The amount of the conditioned air supplied to such a blowout port is large in an upstream portion of the flow path, and is small in a downstream portion of the flow path. Accordingly, the amount of the conditioned air blown out from the blowout port for proximity air-conditioning becomes ununiform, so that suitably performing proximity air-conditioning may be difficult.

By branching the duct, that is, the member that forms the flow path of the conditioned air, into the flow path for general air-conditioning and the flow path for proximity air-conditioning, the conditioned air flowing in the duct is considered to be appropriately distributed to the blowout port for general air-conditioning and the blowout port for proximity air-conditioning, so that an appropriate amount of the conditioned air is supplied to the blowout port for proximity air-conditioning. Also, if the positional relationship between the direction in which the duct extends and the blowout port for proximity air-conditioning is set such that the blowout port for proximity air-conditioning extends in a direction orthogonal to the flow path of the conditioned air, the ununiformity of the amount of the conditioned air blown out from the blowout port for proximity air-conditioning is considered to be reduced.

However, if the duct is branched into the flow path for general air-conditioning and the flow path for proximity air-conditioning, the duct becomes bulky, decreasing the degree of freedom in arrangement of the duct, and the cost required for the duct is also increased. Moreover, if the blowout port for proximity air-conditioning is provided so as to extend in the direction orthogonal to the flow path of the conditioned air, the duct becomes bulkier, further decreasing the degree of freedom in arrangement of the duct.

A first aspect of the present invention has been made in view of such circumstances, and an object of the first aspect of the present invention is to provide a technology capable of performing general air-conditioning and proximity air-conditioning at the same time and capable of reducing the ununiformity of an amount of air-conditioning air blown out from a blowout port for proximity air-conditioning while using a duct that is not branched.

Meanwhile, the inventors of the present invention and others have also developed a technology related to the above proximity air-conditioning, and have already filed a patent application for this technology (see, for example, JP2020-200007 (A)).

JP2020-200007 (A) discloses an air conditioning duct device in which a blowout port for proximity air-conditioning (first blowout port 21) having a long shape is provided in a housing such as a console box and which supplies conditioned air to a seat via the first blowout port.

With the above-described air conditioning duct device of JP2020-200007 (A), sufficiently warming an occupant sitting on a seat with proximity air-conditioning while reducing the amount of energy used is possible.

Meanwhile, in the air conditioning duct device introduced in JP2020-200007 (A), a duct is branched into a flow path for proximity air-conditioning and a flow path for general air-conditioning.

However, if the duct is branched into a flow path for proximity air-conditioning and a flow path for general air-conditioning, the duct becomes bulky, decreasing the degree of freedom in arrangement of the duct, and the cost required for the duct is also increased.

If a duct having a straight tubular shape is used as both a flow path for proximity air-conditioning and a flow path for general air-conditioning, a blowout port for general air-conditioning is provided in one end portion of the duct, and a blowout port, for proximity air-conditioning, having a long shape is provided in a peripheral wall of the duct, making the duct to be compact is possible. However, in this case, since the duct is used as both the flow path for proximity air-conditioning and the flow path for general air-conditioning, supplying a sufficient amount of conditioned air to the flow path for proximity air-conditioning is difficult.

The inventors of the present invention have conducted thorough studies, and have arrived at disposing a damper inside a duct on the far side of a blowout port having a long shape and adjusting the amount of conditioned air supplied to the blowout port having a long shape by the damper. As such a type of damper, using a general damper capable of decreasing a flow path cross-sectional area of the duct by changing a state thereof is considered (see, for example, JP2015-101181 (A)).

Here, when the blowout port has a long shape, a damper having a long shape corresponding to the blowout port is considered needed to be used as the damper for adjusting the amount of conditioned air to be supplied to the blowout port.

A relatively large force is required in order to change the state of such a damper having a long shape, and a relatively large operating load is also applied to an operation portion for manually operating the damper. Therefore, the damper may impose a burden on a user.

In order to reduce the operating load to the damper as much as possible and reduce the burden on the user, increasing the outer shape of the operation portion is effective. Specifically, for example, in the case of a dial-shaped operation portion, preferably, the outer shape of the operation portion is increased.

However, a large space is required in order to dispose an operation portion having a large outer shape.

The space in a vehicle compartment is limited, and ensuring a large space for the operation portion is difficult. Therefore, increasing the outer shape of the operation portion is difficult, and in the air conditioning duct device having the blowout port having a long shape, reducing the operating load to the operation portion is difficult.

Moreover, the amount of the conditioned air supplied to the blowout port having a long shape is large in the upstream portion of the flow path and is small in the downstream portion of the flow path. Accordingly, the amount of the conditioned air blown out from the blowout port having a long shape may become ununiform. In this case, suitably performing air-conditioning may be difficult.

As described above, it is difficult to say that the air conditioning duct device having the blowout port having a long shape still has sufficient functionality, and improvement of the functionality is desired.

A second aspect of the present invention has been made in view of such circumstances, and an object of the second aspect of the present invention is to provide an air conditioning duct device that has a blowout port having a long shape and that has improved functionality.

Solution to Problem

An air conditioning function-equipped console device according to the first aspect which solves the above problem is an air conditioning function-equipped console device including:
- a housing having an internal space and disposed on a lateral side of a seat of a vehicle; and
- a duct assembled to the housing and disposed in the internal space, wherein
- the duct includes a duct body and a fin member including a plurality of fin bodies and disposed inside the duct body,
- the duct body has a straight tubular shape having an inflow port located at one end portion thereof on a front side in a traveling direction of the vehicle and communicating with a vehicle air conditioner and a rear blowout port located at another end portion thereof on a rear side in the traveling direction of the vehicle and facing rear of the vehicle, and having a front blowout port provided between the inflow port and the rear blowout port, extending in an axial direction of the duct body, and facing the seat,
- the fin member faces the front blowout port,
- the respective fin bodies are arranged in the axial direction, and
- projected areas of the respective fin bodies when projected in the axial direction increase from the fin body on the inflow port side toward the fin body on the rear blowout port side.

An air conditioning duct device according to the second aspect which solves the above problem is an air conditioning duct device including:

- a duct mounted on a downstream side of a vehicle air conditioner and having an interior through which conditioned air flows;
- a blowout port providing communication between the interior of the duct and an inside of a vehicle compartment;
- a damper disposed in the interior of the duct on a far side of the blowout port and configured to change a state thereof between a closed state and an opened state in which a protruding amount thereof into the duct is larger than in the closed state, to adjust an amount of the conditioned air supplied to the blowout port; and
- an operation portion connected to the damper and partially exposed in the vehicle compartment, wherein
- the blowout port has a long shape, and
- at least a part of the operation portion is disposed on an outer side in a short-side direction with respect to the blowout port.

The air conditioning function-equipped console device according to the first aspect performs general air-conditioning and proximity air-conditioning at the same time, and reduces the ununiformity of the amount of the air-conditioning air blown out from the blowout port for proximity air-conditioning while using the duct which is not branched.

The air conditioning duct device according to the second aspect has a blowout port having a long shape and has improved functionality.

DESCRIPTION OF EMBODIMENTS

Figure 1:
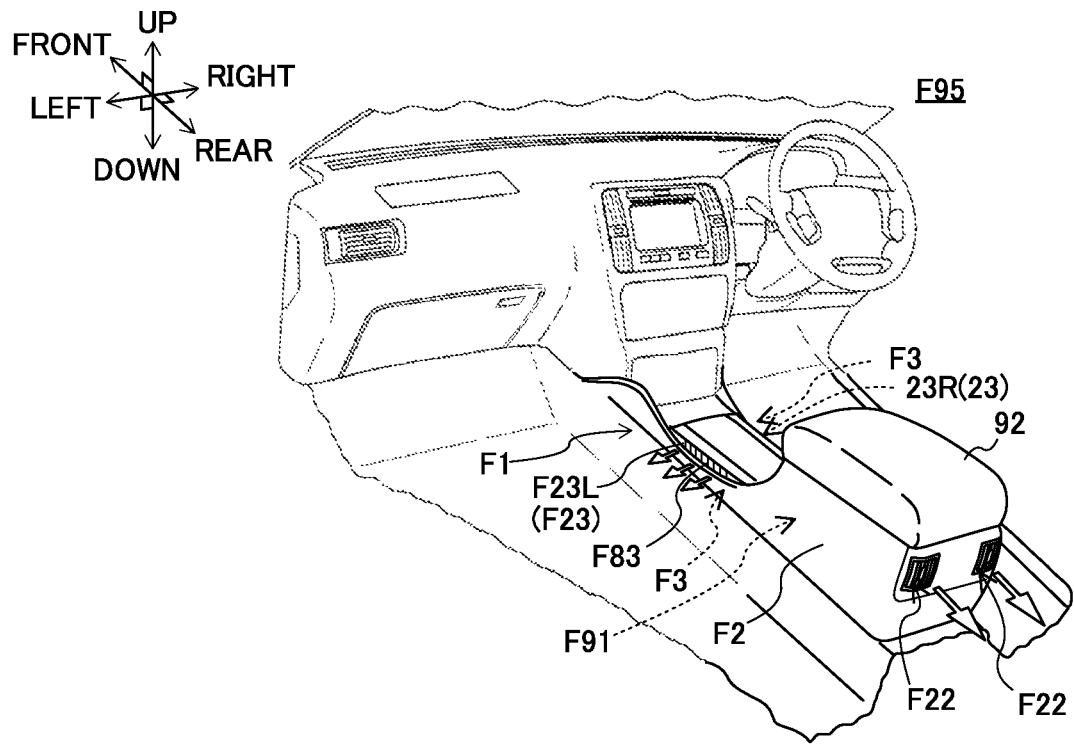
FIG. 1 schematically illustrates an air conditioning function-equipped console device according to Embodiment 1-1 in a vehicle compartment.

The following describes embodiments of the present invention. Unless otherwise mentioned in particular, a numerical value range of "a to b" described in the present specification includes, in the range thereof, a lower limit "a" and an upper limit "b". A numerical value range may be formed by arbitrarily combining such upper limit values, lower limit values, and numerical values described in embodiments and the like. In addition, numerical values arbitrarily selected within a numerical value range may be used as upper limit and lower limit numerical values.

[First Aspect]

Hereinafter, the first aspect of the present invention is described.

An air conditioning function-equipped console device according to the first aspect is an air conditioning function-equipped console device including:

- a housing having an internal space and disposed on a lateral side of a seat of a vehicle; and
- a duct assembled to the housing and disposed in the internal space, wherein
- the duct includes a duct body and a fin member including a plurality of fin bodies and disposed inside the duct body,
- the duct body has a straight tubular shape having an inflow port located at one end portion thereof on a front side in a traveling direction of the vehicle and communicating with a vehicle air conditioner and a rear blowout port located at another end portion thereof on a rear side in the traveling direction of the vehicle and facing rear of the vehicle, and having a front blowout port provided between the inflow port and the rear blowout port, extending in an axial direction of the duct body, and facing the seat,
- the fin member faces the front blowout port,
- the respective fin bodies are arranged in the axial direction, and projected areas of the respective fin bodies when projected in the axial direction increase from the fin body on the inflow port side toward the fin body on the rear blowout port side.

The air conditioning function-equipped console device according to the first aspect includes a duct body which is not branched and has a straight tubular shape. The duct body has a straight tubular shape having an inflow port and a rear blowout port, and further has a front blowout port provided between the inflow port and the rear blowout port. The rear blowout port is a blowout port, for general air-conditioning, from which conditioned air is blown out toward the rear of the vehicle. In addition, the front blowout port is a blowout port, for proximity air-conditioning, from which conditioned air is blown out toward the seat.

In the air conditioning function-equipped console device according to the first aspect, a fin member is disposed inside the duct body. The fin member has a plurality of fin bodies and faces the front blowout port. The conditioned air flowing near the fin bodies in the duct body is guided along the fin bodies to the front blowout port. That is, in the air conditioning function-equipped console device according to the first aspect, the conditioned air flowing through the duct body is distributed to the rear blowout port and the front blowout port by the fin member provided in the duct body. Therefore, the air conditioning function-equipped console device according to the first aspect suitably distributes the conditioned air for both the general air-conditioning and proximity air-conditioning although the air conditioning function-equipped console device has the duct body having a straight tubular shape.

That is, the duct body in the air conditioning function-equipped console device according to the first aspect is not bulky, has an excellent degree of freedom in arrangement, and is low in cost.

In the air conditioning function-equipped console device according to the first aspect, the respective fin bodies in the fin member are arranged in the axial direction of the duct body, and the projected areas of the respective fin bodies when projected in the axial direction increase from the fin body on the inflow port side toward the fin body on the rear blowout port side. That is, out of the plurality of fin bodies, the fin bodies closer to the rear blowout port side come into contact with the conditioned air in a larger area.

When the fin bodies are not taken into consideration, the amount of the conditioned air supplied to a region on the rear blowout port side of the front blowout port is considered to be smaller than that to a region on the inflow port side of the front blowout port. However, in the air conditioning function-equipped console device according to the first aspect, since the fin bodies come into contact with the conditioned air in a larger area, a sufficient amount of the conditioned air is also supplied to the region on the rear blowout port side of the front blowout port. Accordingly, even when the front blowout port has a shape extending in the axial direction of the duct body, that is, along the flow path of the conditioned air, the ununiformity of the amount of the conditioned air supplied to the front blowout port is less ununiform.

Therefore, with the air conditioning function-equipped console device according to the first aspect, the ununiformity of the amount of the air-conditioning air blown out from the front blowout port, that is, the blowout port for proximity air-conditioning, is reduced.

Hereinafter, the air conditioning function-equipped console device according to the first aspect is described for each component thereof.

The air conditioning function-equipped console device according to the first aspect includes a housing having an internal space and disposed on a lateral side of a seat of a vehicle, and a duct assembled to the housing and disposed in the internal space.

The housing may be disposed between a driver seat and a passenger seat, or may be disposed between two rear seats. In some cases, the housing may be disposed on a lateral side of only any one seat, for example, between a seat and a door.

The duct is disposed in the internal space of the housing. The entirety of the duct may be housed in the internal space, or a part of the duct may be exposed to the outside of the internal space, that is, the outside of the housing. In particular, the inflow port in the duct is a portion communicating with the vehicle air conditioner. Therefore, when the efficiency of work of connecting the inflow port and the vehicle air conditioner is taken into consideration, exposing an end portion on the vehicle air conditioner side of the inflow port to the outside of the housing is considered preferable. Preferably, the other portion of the duct is housed in the internal space and is not exposed to the outside of the housing.

Only the duct may be disposed in the internal space of the housing, or a vehicle-mounted device other than the duct may be disposed therein in addition to the duct. Examples of the vehicle-mounted devices include a drink holder, a table, audio equipment, a car navigation system or its monitor, and a touch panel for operating various devices. Each of these vehicle-mounted devices may be regarded as a part of the air conditioning function-equipped console device according to the first aspect, or may be regarded as a device different from the air conditioning function-equipped console device according to the first aspect. The housing may also be used as, for example, a center console box, a table, or the like.

The duct disposed inside the housing has a function of introducing conditioned air from the outside of the housing and blowing out conditioned air to the outside of the housing. Therefore, the housing has openings at positions respectively corresponding to the three openings of the duct, that is, the inflow port, the front blowout port, and the rear blowout port which are provided in the duct body. The respective openings may have shapes corresponding to the inflow port, the front blowout port, and the rear blowout port.

The duct includes a duct body and a fin member. As described above, the duct body has the inflow port, the front blowout port, and the rear blowout port. The duct body has a straight tubular shape in which the inflow port faces the front side in the traveling direction of the vehicle and the rear blowout port faces the rear side in the traveling direction of the vehicle. In the present invention, the straight tubular shape means a shape that is not branched. Therefore, the duct body may be curved or may be bent.

The inflow port in the duct body is a portion communicating with the vehicle air conditioner, and may be disposed on the front side in the traveling direction of the vehicle. That is, the direction of the inflow port may be appropriately set correspondingly to the vehicle air conditioner.

The rear blowout port is disposed on the rear side in the traveling direction of the vehicle, in the duct body, and faces the rear side in the traveling direction of the vehicle. That is, the rear blowout port blows out conditioned air toward a rear portion of the vehicle. The rear blowout port serves as a blowout port, for general air-conditioning, for performing air-conditioning on the rear portion of the vehicle.

The shape of the rear blowout port is not particularly limited. In addition, the direction of the rear blowout port may be directed to the rear side in the traveling direction of the vehicle in order to perform air-conditioning on the rear portion of the vehicle, and for example, may be directed to the rear side and the upper side, the rear side and the lower side, or the like, in the traveling direction of the vehicle.

The front blowout port is provided between the inflow port and the rear blowout port and extends in the axial direction of the duct body. As described above, the front blowout port serves as a blowout port for proximity air-conditioning. Therefore, the front blowout port may also face the seat side. The seat means a seat, of the vehicle, having a lateral side on which the housing is disposed, and for example, in the case where the housing is disposed between the driver seat and the passenger seat, the front blowout port is considered to face the driver seat side and/or the passenger seat side. The air conditioning function-equipped console device according to the first aspect may have two or more ducts. In this case, for example, the front blowout port in one duct may face the driver seat side, and the front blowout port in another duct may face the passenger seat side.

As described above, the front blowout port extends in the axial direction of the duct body. In other words, the front blowout port has a slit shape in which the long-side direction thereof is directed along the axial direction of the duct body. When performing proximity air-conditioning on the vicinity of an occupant sitting on the seat is taken into consideration, the front blowout port preferably extends along the occupant sitting on the seat.

Specifically, the direction in which the front blowout port extends is preferably directed along the front-rear direction of the seat such that the conditioned air blown out from the front blowout port is blown to the legs of the occupant. Depending on the arrangement direction of the duct body, the front blowout port may extend along the up-down direction of the seat. In this case, the conditioned air is blown from the front blowout port toward the trunk of the occupant sitting on the seat.

In the present specification, "extending in the axial direction of the duct body" means that "the long-side direction of the front blowout port is substantially the same as the axial direction of the duct body". The long-side direction of the front blowout port does not have to coincide with the axial direction, and the angle between both directions is preferably not larger than 90°, more preferably not larger than 45°, further preferably not larger than 30°, and particularly preferably not larger than 15°.

Since the long-side direction of the blowout port is substantially the same as the front-rear direction of the seat, the conditioned air flowing out from the blowout port is blown to the entireties of the thighs between the buttocks and the knees of the occupant, so that the thighs of the occupant are efficiently warmed.

Here, warming the back and thighs of a human body in cold weather is considered good. Thus, in order to make an occupant perceive warmth with a smaller amount of heat, intensively warming the back and thighs of the occupant is reasonable.

The back is covered with the backrest of a seat, and is warmed by a seat heater in some cases. Therefore, the occupant is considered to more easily perceive coldness and warmth in the thighs than in the back.

In the air conditioning function-equipped console device according to the first aspect, in the case where the shape of the front blowout port is a slit shape extending along the front-rear direction of the seat, the conditioned air is intensively blown to the entire thighs of the occupant. As a result, efficient air-conditioning is performed such that the occupant perceives that the temperature is a comfortable temperature.

In order to warm or cool the thighs of the occupant in a sufficient range, the length in the long-side direction of the front blowout port is preferably increased to some extent. Specifically, the length in the long-side direction of the front blowout port is preferably not shorter than 50%, more preferably not shorter than 70%, and further preferably not shorter than 80%, of the length in the front-rear direction of the seat surface of the seat.

The actual length in the long-side direction of the front blowout port is preferably not shorter than 150 mm, more preferably not shorter than 170 mm, and particularly preferably not shorter than 200 mm.

Since the front blowout port has the long-side direction, the front blowout port also has a short-side direction. In the present specification, a direction orthogonal to the long-side direction is referred to as a short-side direction. The aspect ratio of the front blowout port, that is, the ratio of the length in the long-side direction to the length in the short-side direction of the front blowout port, is not particularly limited, but from the viewpoint of energy saving, the flow path cross-sectional area of the front blowout port is preferably not excessive. Therefore, the length in the short-side direction of the front blowout port is preferably shorter. Specifically, the length in the long-side direction of the front blowout port is preferably not shorter than two times, more preferably not shorter than three times, further preferably not shorter than five times, and particularly preferably not shorter than ten times the length in the short-side direction of the front blowout port.

Also, in order to more efficiently warm or cool the thighs of the occupant, causing the conditioned air to flow on the thighs of the occupant is considered good. Therefore, the front blowout port is preferably located further above the seat surface of the seat. Preferably, the upper end of the front blowout port is located above the seat surface of the seat, and the distance in the up-down direction between the upper end of the front blowout port and the seat surface is not shorter than 50 mm. Moreover, in this case, more preferably, the lower end of the front blowout port is also located above the seat surface, and the distance in the up-down direction between the lower end of the front blowout port and the seat surface is not shorter than 10 mm.

Examples of more preferable ranges of the above-described distance in the up-down direction between the upper end of the front blowout port and the seat surface include not shorter than 70 mm, not shorter than 100 mm, and not shorter than 150 mm. There is no particular upper limit to the distance in the up-down direction between the upper end of the front blowout port and the seat surface, but examples of preferable ranges thereof include not longer than 250 mm, not longer than 230 mm, and not longer than 200 mm.

Also, examples of more preferable ranges of the above-described distance in the up-down direction between the lower end of the front blowout port and the seat surface include not shorter than 20 mm, not shorter than 40 mm, and not shorter than 80 mm. There is no particular upper limit to the distance in the up-down direction between the lower end of the front blowout port and the seat surface, but examples of preferable ranges thereof include not longer than 170 mm, not longer than 150 mm, and not longer than 140 mm.

The duct body may have a straight tubular shape having an inflow port, a front blowout port, and a rear blowout port, and may have a flow path of conditioned air therein, and the shape and the material thereof are not particularly limited.

For the convenience of mounting on the vehicle, the duct body is preferably lightweight, and a resin or rubber is preferably selected as the material of the duct body. The duct body may be integrally molded as a whole by a method such as blow molding, injection blow molding, and water assisted molding, or may be obtained by molding a plurality of partial portions and assembling and integrating the partial portions to each other.

In the air conditioning function-equipped console device according to the first aspect, the fin member is provided inside the duct body. The fin member includes a plurality of fin bodies and faces the front blowout port. In other words, each fin body has a function of interfering with the flow path of the conditioned air leading to the front blowout port in the duct body, and guiding the conditioned air to the front blowout port.

Of the conditioned air flowing inside the duct body, the conditioned air flowing near the fin bodies that are present on the inflow port side is guided by these fin bodies and blown out from the front blowout port to the outside of the duct. The rest of the conditioned air flowing inside the duct body further flows toward the flow path downstream side. Here, in the air conditioning function-equipped console device according to the first aspect, the respective fin bodies are arranged in the axial direction of the duct body, and the projected areas of the respective fin bodies when projected in the axial direction of the duct body increase from the fin body on the inflow port side toward the fin body on the rear blowout port side. Therefore, a part of the conditioned air flowing through a position away from the fin body located on the inflow port side, that is, the flow path upstream side, flows near the other fin bodies on the flow path downstream side of these fin bodies, is guided by the other fin bodies, and is blown from the front blowout port to the outside of the duct. Therefore, in the air conditioning function-equipped console device according to the first aspect, a sufficient amount of the conditioned air is also supplied to the region on the rear blowout port side, that is, on the flow path downstream side, in the front blowout port. Therefore, in the air conditioning function-equipped console device according to the first aspect, the ununiformity of the amount of the conditioned air blown out from the front blowout port, that is, the blowout port for proximity air-conditioning, is reduced.

Here, the projected areas of the fin bodies when projected in the axial direction of the duct body each mean a projected area of a portion, of the fin body, which is located inside the duct body. In addition, the projected area is rephrased as the protruding length of the fin body inside the duct body, and the protruding lengths of the fin bodies are considered to increase from the fin body located on the inflow port side toward the fin body located on the rear blowout port side. Alternatively, the projected areas of the fin bodies may be represented by the flow path cross-sectional area of the duct. Specifically, as the above-described projected areas of the fin bodies increase, the areas of the fin bodies protruding inside the duct body increase, and the flow path cross-sectional area of the duct in the direction orthogonal to the axial direction decreases. Therefore, the flow path cross-sectional area of the duct is considered to decrease from the inflow port side toward the rear blowout port side on the far side of the front blowout port. Hereinafter, according to need, "the projected areas of the fin bodies when projected in the axial direction of the duct body" are sometimes referred to simply as projected areas of the fin bodies. In addition, according to need, the "flow path cross-sectional area of the duct in the direction orthogonal to the axial direction thereof" is sometimes referred to simply as flow path cross-sectional area of the duct.

Each fin body may be rotatable. If each fin body is rotatable, the conditioned air blown out from the front blowout port is guided in various directions in accordance with the rotation angle of each fin body. In this case, preferably, the respective fin bodies synchronously rotate.

As the fin bodies rotate, the projected areas thereof change, and the flow path cross-sectional area of the duct also changes. Each fin body rotates between: a first position at which the projected areas of the fin bodies are minimized and the flow path cross-sectional area of the duct is maximized; and a second position at which the projected areas of the fin bodies are maximized and the flow path cross-sectional area of the duct is minimized. Each fin body may further have a so-called fin shut function of rotating to close the front blowout port. When the respective fin bodies have rotated to a position at which the front blowout port is closed, the projected areas of the respective fin bodies are substantially equal to each other. Therefore, in the present specification, the projected areas of the fin bodies when "the projected areas of the respective fin bodies increase from the fin body on the inflow port side toward the fin body on the rear blowout port side" mean the projected areas of the fin bodies in a state where the front blowout port is opened, and more specifically mean the projected areas of the fin bodies when the fin bodies are at the above-described second position.

In the air conditioning function-equipped console device according to the first aspect, in order to suitably perform general air-conditioning, even when the fin bodies are at the above-described second position, the flow path of the conditioned air preferably remains in the duct. In other words, preferably, the fin bodies do not close the duct even when the fin bodies are at the second position. Specifically, the flow path cross-sectional area of the duct on the far side of the front blowout port when the fin bodies are at the second position is preferably, for example, in a range of 5 area % or greater, 10 area % or greater, 20 area % or greater, or 30 area % or greater of that when the fin bodies are at the first position. In particular, when the fin bodies are at the second position, the flow path cross-sectional area of the duct is preferably 20 area % or greater of that when the fin bodies are at the first position. In other words, the flow path cross-sectional area of the duct when the fin bodies are at the second position is preferably 20% or greater of the flow path cross-sectional area of the duct when the fin bodies are at the first position.

There is no upper limit to the flow path cross-sectional area of the duct at this time. However, in order to ensure a sufficient amount of conditioned air for proximity air-conditioning, the flow path cross-sectional area of the duct when the fin bodies are at the second position is preferably, for example, in a range of 90 area % or less, 85 area % or less, 80 area % or less, 75 area % or less, or 70 area % or less of that when the fin bodies are at the first position.

As used herein, the flow path cross-sectional area means a value obtained by accumulating the flow path cross-sectional area of the duct on the far side of the front blowout port, in the long-side direction of the front blowout port, that is, the axial direction of the duct.

The air conditioning function-equipped console device according to the first aspect may have a damper member for opening and closing the duct, in addition to the fin member. The damper member is preferably disposed between the front blowout port and the rear blowout port.

[Second Aspect]

Hereinafter, the second aspect of the present invention is described.

An air conditioning duct device according to the second aspect includes a blowout port having a long shape. In the air conditioning duct device according to the second aspect, a damper whose state changes between an opened state and a closed state is disposed in an interior of the duct on the far side of the blowout port. The amount of conditioned air supplied to the blowout port is adjusted by changing the state of the damper.

The air conditioning duct device according to the second aspect includes an operation portion connected to the damper and partially exposed in a vehicle compartment. A user is allowed to change the state of the damper to appropriately adjust the amount of conditioned air supplied to the blowout port to a required amount, by operating a portion, of the operation portion, which is exposed in the vehicle compartment.

Here, in the air conditioning duct device according to the second aspect, the blowout port has a long shape. In order to adjust the amount of conditioned air supplied to the blowout port having such a shape, a damper having a long shape needs to be used as described above. Then, a relatively large force is required to change the state of the damper having a long shape, so that an operating load applied to the operation portion becomes large.

As described above, an operation portion having a large outer shape is required in order to reduce the operating load applied to the operation portion. The operation portion of the air conditioning duct device is usually disposed on the lateral side of the blowout port, but a large space is required in order to dispose the operation portion having a large outer shape on the lateral side of the blowout port having a long shape. Therefore, in a conventional air conditioning duct device, increasing the outer shape of the operation portion is difficult, so that reducing the operating load to the operation portion is difficult. Furthermore, in the conventional air conditioning duct device, adjusting the amount of conditioned air supplied to the blowout port as desired is difficult. Accordingly, sufficient improvement of the functionality of the conventional air conditioning duct device is difficult.

On the other hand, in the air conditioning duct device according to the second aspect, at least a part of the operation portion is disposed on the outer side in the short-side direction with respect to the blowout port. A relatively large space is ensured along the long-side direction of the blowout port on the outer side in the short-side direction of the blowout port having a long shape. Therefore, an operation portion having a relatively large outer shape is allowed to be provided as the operation portion in the air conditioning duct device according to the second aspect, and the operating load applied to the operation portion is reduced.

Hereinafter, the air conditioning duct device according to the second aspect is described for each component thereof.

The air conditioning duct device according to the second aspect includes a blowout port having a long shape, and the use of the blowout port is not particularly limited. The blowout port is preferably a blowout port for proximity air-conditioning described above, but may be used as a blowout port for general air-conditioning, and further may be used as a blowout port of a defroster for supplying conditioned air to a windshield or the like.

The long shape of the blowout port means a shape in which an opening length in a first direction is larger than an opening length in a second direction orthogonal to the first direction, and specifically means a shape in which the opening length in the first direction is not less than twice the opening length in the second direction. The shape of the blowout port may be a rectangular shape, or may be an elliptical shape or another shape.

In the case where the blowout port is a blowout port for proximity air-conditioning, the blowout port is preferably disposed on a lateral side of a seat, and a long-side direction thereof is more preferably a direction along the traveling direction of a vehicle. This is for supplying conditioned air mainly to the thighs of an occupant sitting on the seat.

In the present specification, "along" means to intersect the target direction at an angle within 45°. The intersection angle in this case is preferably, for example, within 30°, within 20°, within 10°, or within 5°. The intersection angle is particularly preferably 0°.

That is, the long-side direction of the blowout port is particularly preferably the traveling direction of the vehicle.

Further, regarding the shape of the blowout port, when the opening length in the first direction of the blowout port is not less than 3 times and more preferably not less than 5 times the opening length in the second direction thereof, the effects by the air conditioning duct device according to the second aspect become more remarkable.

The blowout port may be any port that provides communication between the interior of the duct and the inside of the vehicle compartment, and is considered as a portion that is integrally provided to the duct and partially exposed in the vehicle compartment.

The blowout port may be provided in one end portion of the duct or may be provided in a peripheral wall of the duct. The air conditioning duct device according to the second aspect may further include another blowout port in addition to the blowout port having a long shape.

That is, using the air conditioning duct device according to the second aspect as an air conditioning duct device for performing both proximity air-conditioning and general air-conditioning described above is possible. In this case, a blowout port having a long shape may be provided in the peripheral wall of the duct and used as a blowout port for proximity air-conditioning. A second blowout port may be provided in one end portion, of the duct, located on the downstream side of the blowout port having a long shape, and may be used as a blowout port for general air-conditioning.

A second duct may be connected to the one end portion, of the duct, located on the downstream side of the blowout port having a long shape. A third blowout port may be provided to the second duct, and this third blowout port may be used as a blowout port for proximity air-conditioning, or may be used as a blowout port for general air-conditioning.

The duct may be mounted on a downstream side of the vehicle air conditioner, and conditioned air may flow therein. The shape of the duct is not particularly limited, but is preferably a straight tubular shape if the air conditioning duct device according to the second aspect is an air conditioning duct device for performing both proximity air-conditioning and the general air-conditioning.

The vehicle air conditioner to which the duct is connected may be a vehicle air conditioner that utilizes exhaust heat of an engine or an electric heater as a heat source.

The damper is disposed in the interior of the duct on the far side of the above-described blowout port. The damper is a member separate from the blowout port and the duct, is directly or indirectly mounted on the duct, and changes the state thereof between the opened state and the closed state.

The protruding amount of the damper into the duct is larger in the opened state than in the closed state. That is, the damper closes the blowout port in the closed state, and the protruding amount of the damper into the duct is small at this time. On the other hand, the damper opens the blowout port in the opened state, and the protruding amount of the damper into the duct becomes larger. The amount of the conditioned air supplied to the blowout port is adjusted by the damper opening and closing the blowout port on the far side of the blowout port as described above.

As described above, the damper greatly protrudes into the duct in the opened state. Therefore, in the opened state, the damper is considered to divide the flow path of the conditioned air in the duct. Specifically, the conditioned air that has come into contact with the surface on the upstream side of the damper flows along the surface on the upstream side and is guided to the blowout port. The conditioned air that has not come into contact with the surface on the upstream side flows in the duct toward the downstream side of the blowout port.

Since the damper greatly protrudes into the duct in the opened state, the amount of the conditioned air that comes into contact with the damper is larger in the opened state than in the closed state. Therefore, the amount of the conditioned air guided by the damper is larger when the damper is in the opened state, than when the damper is in the closed state. Also, owing to this, the damper in the air conditioning duct device according to the second aspect is considered to adjust the amount of the conditioned air supplied to the blowout port, by changing the state thereof between the opened state and the closed state.

Here, in the present specification, the protruding amount of the damper is rephrased as the projected area of the damper in the upstream-downstream direction of the duct, or the protruding length of the damper toward the far side of the blowout port. The same applies to damper partial portions described later.

In order to open and close the blowout port, the damper preferably has a long shape corresponding to the blowout port.

The damper may have a single structure or may be composed of a plurality of damper partial portions. In the case where the damper is composed of a plurality of damper partial portions, the size of each damper partial portion is reduced. Accordingly, a force required to change the state of each damper partial portion is expected to be reduced, or an operating load to the operation portion is expected to be reduced.

In the closed state, the damper may close only a part of the blowout port, or may close the entirety of the blowout port. When the damper closes the entirety of the blowout port in the closed state, preferably, adjacent damper partial portions are connected to each other so as to be flush with each other without any gap therebetween, or end portions thereof overlap each other, in the closed state.

In the case where the damper is composed of a plurality of damper partial portions, each damper partial portion may independently change a state thereof. In this case, preferably, different operation portions are connected to the respective damper partial portions. However, when the operability of the damper is taken into consideration, the respective damper partial portions preferably change the states thereof in synchronization with each other. In this case, the respective damper partial portions may be connected via a link member, and the operation portion may be connected to any of the damper partial portions or the link member. As the link member, a member having a known structure that allows a force applied to the operation portion to be transmitted to each damper partial portion, may be adopted.

The respective damper partial portions are preferably arranged along the long-side direction of the blowout port. As described above, preferably, the damper has a long shape corresponding to the shape of the blowout port, and when the damper partial portions are arranged in this manner, the length of each damper partial portion in the long-side direction of the blowout port is made sufficiently small, and the damper, which is an assembly of the damper partial portions, is made to have a sufficient length in the long-side direction of the blowout port.

The respective damper partial portions are preferably arranged along the upstream-downstream direction. In this case, the long-side direction of the blowout port is also preferably directed along the upstream-downstream direction.

According to this mode, the flow path of the conditioned air in the duct is divided into separate paths by the respective damper partial portions, and the conditioned air is guided by the respective damper partial portions to different regions in the upstream-downstream direction in the blowout port. Accordingly, the conditioned air is supplied to the different regions in the upstream-downstream direction in the blowout port uniformly or in a desired amount, and the ununiformity of the amount of the conditioned air blown out from the blowout port is eliminated or reduced even though the blowout port has a long shape and the long-side direction thereof is directed along the upstream-downstream direction.

The protruding amounts of the respective damper partial portions into the duct may be the same or different from each other, but in order to control the amount of the conditioned air supplied to the blowout port as desired, the protruding amounts preferably increase from the damper partial portion on the upstream side toward the damper partial portion on the downstream side in the opened state.

Specifically, the protruding amount of the damper partial portion on the downstream side is preferably not less than twice and more preferably not less than three times the protruding amount of the damper partial portion on the upstream side.

When the protruding amounts of the damper partial portions are set to have such a ratio, the ununiformity of the amount of the conditioned air blown out from the blowout port having a long shape is eliminated or reduced.

In the case where the damper is composed of two damper partial portions, the protruding amounts of the respective damper partial portions are preferably, for example, amounts having a ratio of 1:3 from the upstream side toward the downstream side. In this case, the flow path in the duct is divided in 1:2 from the blowout port toward the far side.

In the case where the damper is composed of three damper partial portions, the protruding amounts of the respective damper partial portions are preferably, for example, amounts having a ratio of 1:2:3 from the upstream side toward the downstream side. In this case, the flow path in the duct is divided in 1:1:1 from the blowout port toward the far side.

Furthermore, the protruding amount of the damper partial portion on the most upstream side is considered to be preferably not less than 1/4, more preferably in a range of 1/3 to 2/3, and particularly preferably in a range of 2/5 to 3/5 of the length in the near-far direction of the interior of the duct.

When the protruding amount of the damper partial portion is set to have such a ratio, the ununiformity of the amount of the conditioned air blown out from the blowout port having a long shape is eliminated or reduced.

An end portion, of the damper or each damper partial portion, located on the blowout port side in the opened state is preferably located at a position close to the blowout port in the opened state. Hereinafter, according to need, the end portion, of the damper or each damper partial portion, located on the blowout port side in the opened state is referred to as a blowout-side end portion.

When the blowout-side end portion is located at a position close to the blowout port in the opened state, the flow path of the conditioned air leading from the interior of the duct to the blowout port is divided by the damper. Accordingly, the amount of the conditioned air supplied to the blowout port is controlled as desired.

Specifically, the distance between the blowout-side end portion and the blowout port in the opened state is preferably, for example, in a range of 10 mm or less, 5 mm or less, or 2 mm or less. The distance between the blowout-side end portion and the blowout port in the opened state is particularly preferably 0 mm.

When the blowout-side end portion is located at a position close to the blowout port in the opened state, the amount of the conditioned air supplied to the blowout port is considered to be adjusted for each region of the blowout port in the upstream-downstream direction by each damper partial portion. Hereinafter, according to need, each region of the blowout port is referred to as a blowout region.

When the amount of the conditioned air supplied to the blowout port is adjusted for each blowout region of the blowout port by each damper partial portion, the opening area of the blowout region on the downstream side is preferably not less than 1 times and more preferably not less than 2 times the opening area of the blowout region on the upstream side.

When the opening areas of the blowout regions are set to have such a ratio, the ununiformity of the amount of the conditioned air blown out from the blowout port having a long shape is eliminated or reduced.

In the case where the damper is composed of two damper partial portions and the blowout port is divided into two blowout regions by the two damper partial portions, the opening areas of the respective blowout regions are preferably, for example, amounts having a ratio of 1:2 from the upstream side toward the downstream side.

In the case where the damper is composed of three damper partial portions and the blowout port is divided into three blowout regions by the three damper partial portions, the opening areas of the respective blowout regions are preferably, for example, amounts having a ratio of 1:1:1 from the upstream side toward the downstream side.

As a mechanism for changing the state of the damper or each damper partial portion, a known mechanism employing rotation or the like may be used. Hereinafter, the damper and the damper partial portions are sometimes collectively referred to as damper.

In the case where the damper rotates, the damper may rotate about a rotation shaft whose position does not change, or may rotate about a rotation shaft whose position changes such as by sliding. In the case where the position of the rotation shaft does not change, the structure of the damper becomes robust, so that there is an advantage that the durability of the damper is improved. On the other hand, in the case where the position of the rotation shaft changes, the trajectory of the damper when the damper changes the state thereof is made smaller, so that there is an advantage that the vehicle air conditioner is made more compact.

The rotation shaft of the damper may be provided at an end portion of the damper, or may be provided at a center portion of the damper. However, preferably, also in the opened state, the damper is located on the far side of the blowout port and not exposed on the near side of the blowout port, that is, on the inside of the vehicle compartment. Therefore, when the positional relationship between the rotation shaft of the damper and the blowout port and the duct is taken into consideration, the rotation shaft of the damper is preferably located at the end portion of the damper on the blowout port side in the duct.

The operation portion is a portion that is connected to the damper and partially exposed in the vehicle compartment, and is a portion that is operated by the user to change the state of the damper.

The operation portion may have a shape that facilitates the operation of the user, and may have a known shape such as a dial shape or a lever shape.

Here, as the size of the operation portion is larger, the operating load applied to the operation portion is made smaller by the principle of leverage. The length of the operation portion in the long-side direction of the blowout port is preferably not less than 1/8 times, more preferably not less than 1/5 times, and further preferably not less than 1/3 times the length of the blowout port in the long-side direction, that is, the above-described opening length in the first direction of the blowout port.

At least a part of the operation portion is disposed on the outer side in the short-side direction with respect to the blowout port. Accordingly, in the air conditioning duct device according to the second aspect, the operation portion having a large outer shape is allowed to be disposed in a small space. The long-side direction of the operation portion is preferably directed along the long-side direction of the blowout port. Alternatively, the long-side direction of the operation portion may be directed along the near-far direction of the blowout port. Furthermore, a straight line extending in the long-side direction of the operation portion may be coplanar with a straight line extending in the long-side direction of the blowout port and a straight line extending in the near-far direction of the blowout port. In either case, the operation portion having a large outer shape is allowed to be disposed in a small space.

Hereinafter, the air conditioning function-equipped console device according to the first aspect and the air conditioning duct device according to the second aspect are described with specific examples.

Embodiment 1-1

Embodiment 1-1 is an embodiment of the air conditioning function-equipped console device according to the first aspect.

Figure 2:
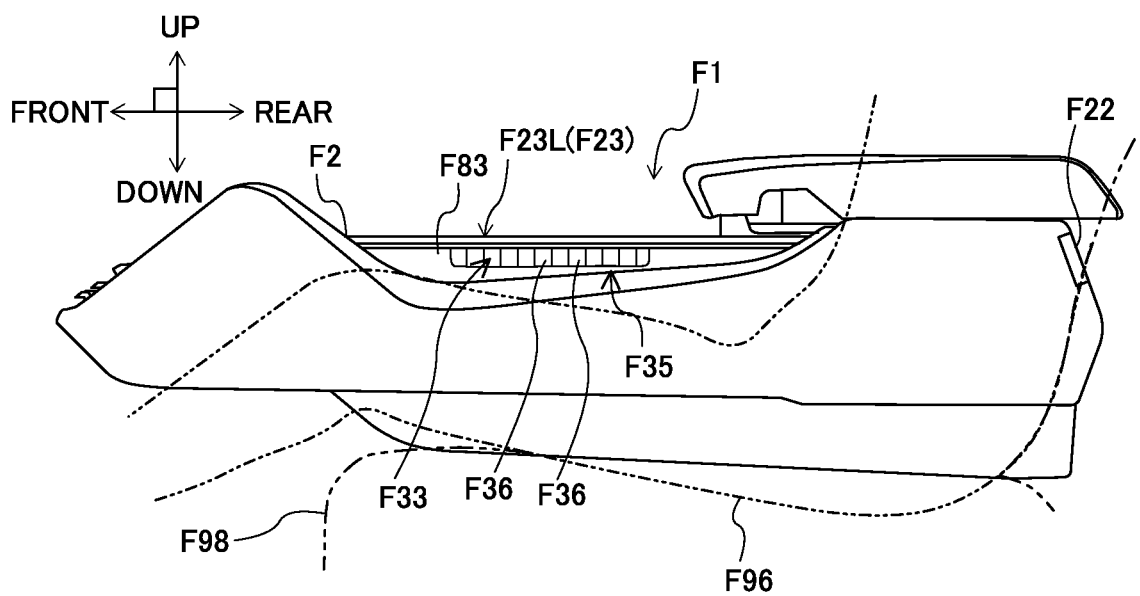
FIG. 2 schematically illustrates a side view of the air conditioning function-equipped console device according to Embodiment 1-1.
Figure 3:
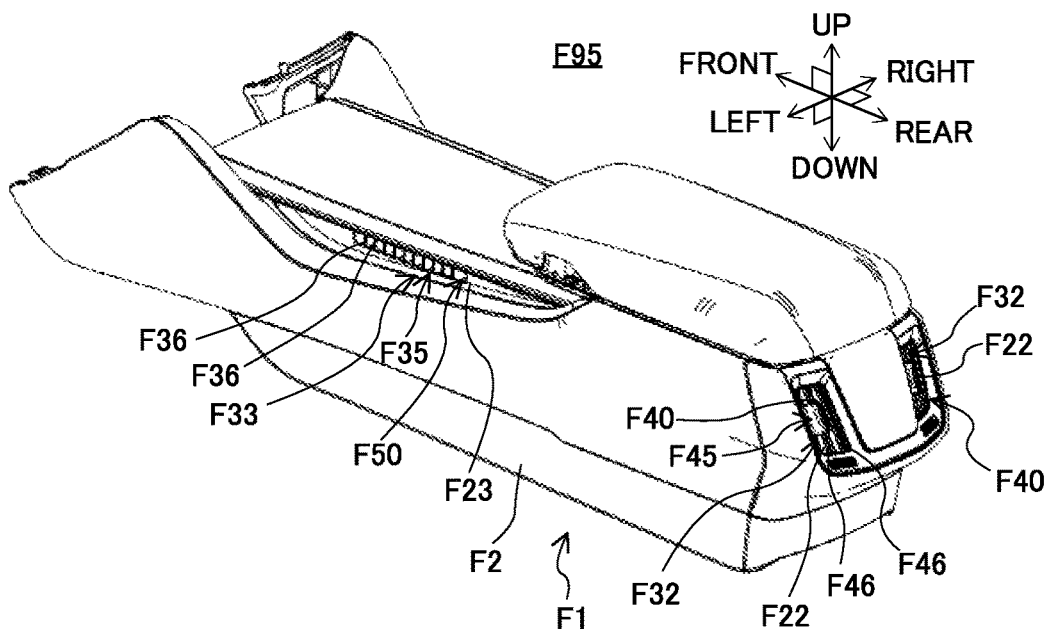
FIG. 3 schematically illustrates the air conditioning function-equipped console device according to Embodiment 1-1 in which fin bodies are at a second position.
Figure 4:
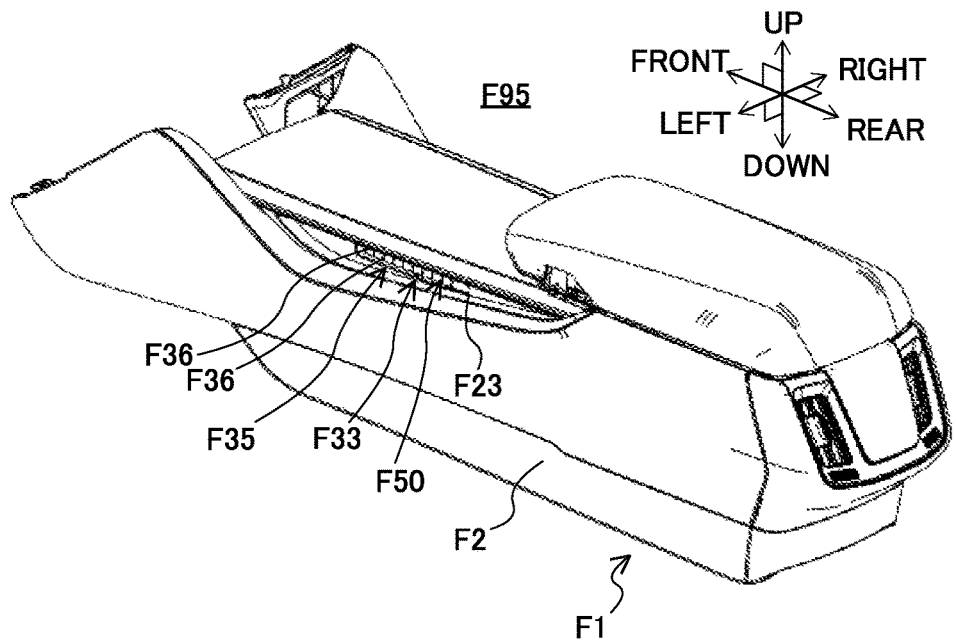
FIG. 4 schematically illustrates the air conditioning function-equipped console device according to Embodiment 1-1 in which the fin bodies are at a first position.
Figure 5:
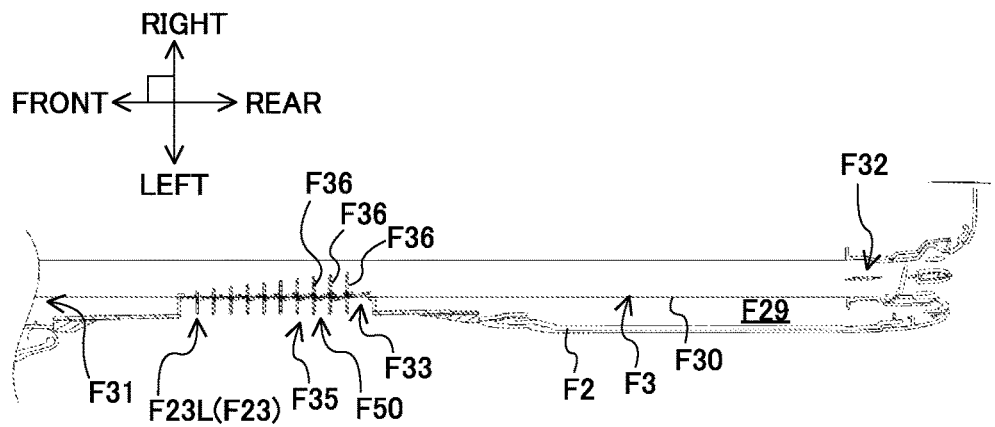
FIG. 5 schematically illustrates a cross-section of the air conditioning function-equipped console device according to Embodiment 1-1.
Figure 6:
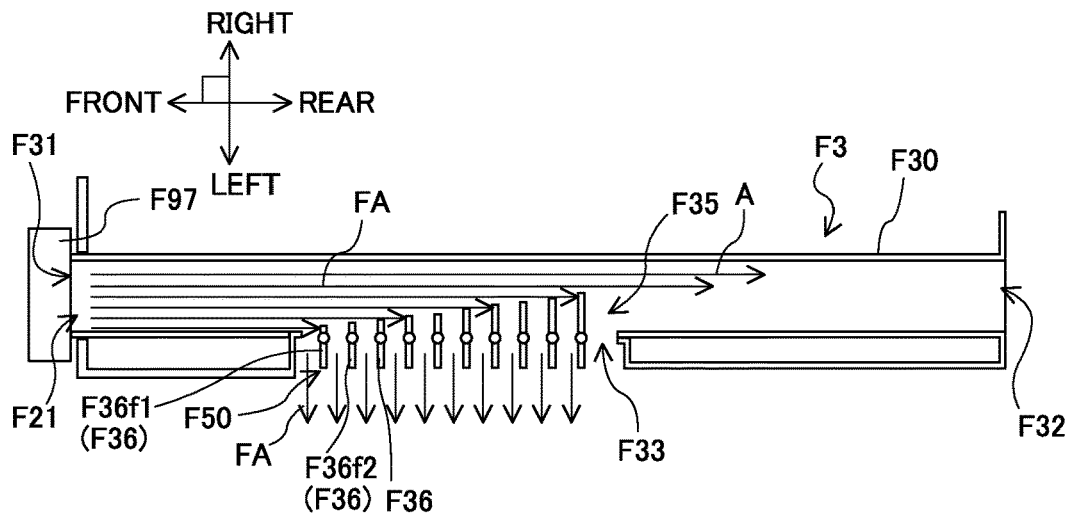
FIG. 6 schematically illustrates a duct in the air conditioning function-equipped console device according to Embodiment 1-1 in which the fin bodies are at the second position.
Figure 7:
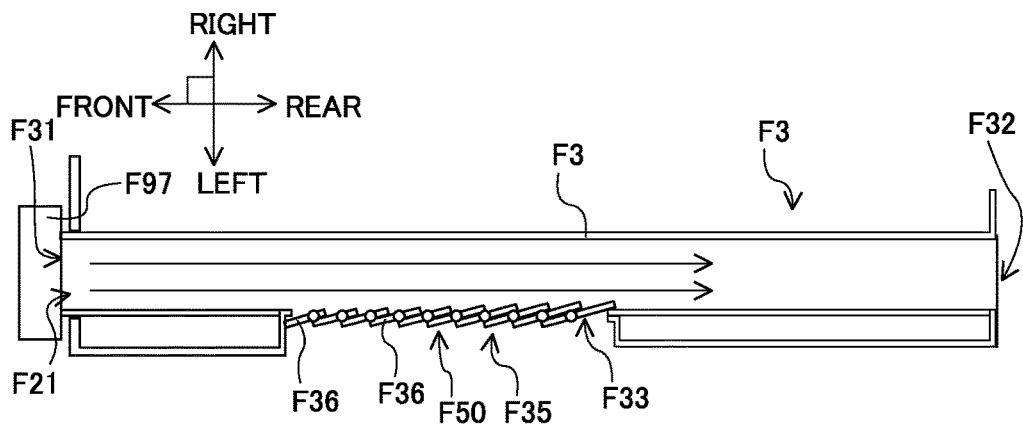
FIG. 7 schematically illustrates the duct in the air conditioning function-equipped console device according to Embodiment 1-1 in which the fin bodies are at the first position.

FIG. 1 schematically illustrates an air conditioning function-equipped console device according to Embodiment 1-1 in a vehicle compartment. FIG. 2 schematically illustrates a side view of the air conditioning function-equipped console device according to Embodiment 1-1. FIG. 3 schematically illustrates the air conditioning function-equipped console device according to Embodiment 1-1 in which fin bodies are at a second position. FIG. 4 schematically illustrates the air conditioning function-equipped console device according to Embodiment 1-1 in which the fin bodies are at a first position. FIG. 5 schematically illustrates a cross-section of the air conditioning function-equipped console device according to Embodiment 1-1. FIG. 6 schematically illustrates a duct in the air conditioning function-equipped console device according to Embodiment 1-1 in which the fin bodies are at the second position. FIG. 7 schematically illustrates the duct in the air conditioning function-equipped console device according to Embodiment 1-1 in which the fin bodies are at the first position. Hereinafter, upper and lower mean the upper side and the lower side in the vertical direction, and front, rear, left, and right mean the front, the rear, the left, and the right in the traveling direction of a vehicle. The right-left direction coincides with the width direction of the vehicle, and the front-rear direction coincides with the traveling direction of the vehicle.

As shown in FIG. 1, an air conditioning function-equipped console device F1 according to Embodiment 1-1 is disposed in a vehicle compartment F95, and includes a housing F2, ducts F3, an item compartment F91, and a lid F92. As shown in FIG. 1, the housing F2 is a center console box of the vehicle. The housing F2 is disposed between a passenger seat F98 (see FIG. 2) and a driver seat (not shown) both of which are front seats.

The long-side direction of the housing F2 is directed in the front-rear direction. As shown in FIG. 1, FIG. 3, and FIG. 4, the housing F2 is provided with two front openings F23, two rear openings F22, and two inflow openings F21 (see FIGS. 6 and 7). As shown in FIG. 1 and FIG. 2, one front opening F23L is provided in a front upper portion of a left wall of the housing F2. As shown in FIG. 3, the front opening F23L is open toward the passenger seat F98. The other front opening F23R is provided in a front upper portion of a right wall of the housing F2, and is open toward the driver seat (not shown).

As shown in FIG. 1, the two rear openings F22 are provided in an upper portion of a rear wall of the housing F2, and are open toward the rear side. One rear opening F22L is located on the left side, and the other rear opening F22R is located on the right side.

As shown in FIG. 5, the housing F2 has a box shape having an internal space F29. The duct F3 is disposed in the internal space F29 of the housing F2. Although not shown, the two ducts F3 are arranged in the right-left direction inside the housing F2. Although not shown, the item compartment F91 has a box shape that is open upward, and is disposed between the two ducts F3. An upper portion of the item compartment F91 is covered with the lid F92.

The housing F2 and the ducts F3 are made of a resin, and each duct F3 is molded as a member separate from the housing F2 and assembled to the housing F2.

As shown in FIGS. 5 to 7, each duct F3 includes a duct body F30 and a fin member F35. The duct body F30 has a straight tubular shape extending substantially in the front-rear direction. More specifically, in the duct F3, an inflow port F31 which is at one end in the axial direction thereof faces the front side, and a rear blowout port F32 which is at the other end in the axial direction thereof faces the rear side. As shown in FIGS. 6 and 7, the inflow port F31 is open frontward, is exposed to the front side of the housing F2 via the inflow opening F21, and communicates with a vehicle air conditioner F97 which is disposed at a front portion of the vehicle. Since the inflow port F31 of the duct body F30 communicates with the vehicle air conditioner F97, the conditioned air supplied from the vehicle air conditioner F97 to the duct body F30 flows inside the duct body F30 from the front side toward the rear side, that is, from the inflow port F31 side toward the rear blowout port F32 side.

The vehicle air conditioner F97 is also referred to as a heating ventilating air conditioning (HVAC) system, and includes a heat pump system (not shown) for heating and cooling the vehicle compartment F95, and a blower (not shown).

As shown in FIGS. 3 and 4, the rear blowout port F32 is open toward a vehicle compartment rear portion. A rear register F40 is mounted in the rear blowout port F32. The rear register F40 includes a rear fin member F45 disposed inside the duct body F30. The rear fin member F45 includes a plurality of rear fin bodies F46 which rotate in synchronization with each other, and adjusts the direction of the conditioned air blown out from the rear blowout port F32 toward the vehicle compartment rear portion.

As shown in FIG. 5, the duct body F30 has a front blowout port F33 in a side wall thereof. The front blowout port F33 extends along the axial direction of the duct body F30 and faces a lateral side, that is, a seat. In the air conditioning function-equipped console device F1 according to Embodiment 1-1, the front blowout port F33 (not shown) of one duct F3 faces the driver seat (not shown), and the front blowout port F33 of the other duct F3 faces the passenger seat F98.

The front blowout port F33 communicates with the front opening F23 of the housing F2.

A front register F50 is mounted in the front blowout port F33. The front register F50 includes the fin member F35 disposed inside the duct body F30. Each fin member F35 includes fin bodies F36 arranged in the axial direction. The respective fin bodies F36 are connected by a link mechanism (not shown), and synchronously rotate between the second position shown in FIG. 3, FIG. 5, and FIG. 6, and the first position shown in FIG. 4 and FIG. 7.

As shown in FIG. 5 and FIG. 6, the length of each fin body F36, that is, the length of each fin body F36 toward the interior of the duct body F30 is larger from the front side, that is, the inflow port F31 side, toward the rear side, that is, the rear blowout port F32 side, and the respective fin bodies F36 are arranged such that the left ends thereof are aligned with each other. Therefore, the protruding lengths of the fin bodies F36 inside the duct body F30 increase from the fin bodies F36 on the inflow port F31 side toward the fin bodies F36 on the rear blowout port F32 side.

Therefore, the projected areas of the respective fin bodies F36 when projected in the axial direction are considered to increase from the fin bodies F36 on the inflow port F31 side toward the fin bodies F36 on the rear blowout port F32 side.

The projected areas are considered as the areas of the respective fin bodies F36 when projected from the front side toward the rear side. In addition, the projected areas are also considered as the areas of the respective fin bodies F36 when projected from the rear side toward the front side.

As shown in FIG. 2, each fin body F36 covers the entirety in the height direction of the front blowout port F33. In the air conditioning function-equipped console device F1 according to Embodiment 1-1, the heights of the fin bodies F36, that is, the lengths in the up-down direction of the fin bodies F36, are all substantially equal to each other. Furthermore, the length in the up-down direction of the same fin body is substantially uniform. In the air conditioning function-equipped console device F1 according to Embodiment 1-1, the shape of each fin body F36 is not limited thereto, and may be appropriately set according to the shape of the duct body F30, the shape of the front blowout port F33, etc.

At the second position shown in FIG. 6, the projected area of each fin body F36 in a direction orthogonal to the front-rear direction, that is, the axial direction, is maximized.

At the first position shown in FIG. 7, the projected area of each fin body F36 in the direction orthogonal to the axial direction is minimized. In the air conditioning function-equipped console device F1 according to Embodiment 1-1, the front register F50 is a so-called fin shut register, and at the first position, the respective fin bodies F36 overlap each other to close the front blowout port F33.

Hereinafter, operation of the air conditioning function-equipped console device F1 according to Embodiment 1-1 is described.

As shown in FIGS. 6 and 7, conditioned air A from the vehicle air conditioner F97 flows through the inflow port F31 into the duct body F30 and flows therein toward the rear blowout port F32. As shown in FIG. 7, when the respective fin bodies F36 are at the first position, the front blowout port F33 is closed by the respective fin bodies F36, and almost all of the conditioned air A having flowed into the duct body F30 is supplied to the rear blowout port F32 and blown out through the rear blowout port F32 toward the vehicle compartment rear portion.

When the respective fin bodies F36 are at a position other than the first position, for example, when the respective fin bodies F36 are at the second position as shown in FIG. 6, the front blowout port F33 is opened. At this time, the protruding length of each fin body F36 in the duct body F30 is increased, and each fin body F36 interferes with the flow path of the conditioned air A.

Here, as shown in FIG. 6, the protruding lengths of the respective fin bodies F36 inside the duct body F30 gradually increase from the fin bodies F36 on the inflow port F31 side toward the fin bodies F36 on the rear blowout port F32 side. In other words, the projected areas of the respective fin bodies F36 gradually increase from the fin bodies F36 on the inflow port F31 side toward the fin bodies F36 on the rear blowout port F32 side. Accordingly, the flow path cross-sectional area of the duct F3 in the direction orthogonal to the axial direction of the duct body F30 gradually decreases from the inflow port F31 side toward the rear blowout port F32 side on the far side of the front blowout port F33.

By arranging the fin bodies F36 as described above, of the conditioned air A flowing inside the duct body F30, the conditioned air flowing on the left side of the duct body F30, that is, the front blowout port F33 side, comes into contact with a fin body F36/1 located closest to the inflow port F31, out of the respective fin bodies F36. Then, the conditioned air A is guided by the fin body F36/1 to change the flow path thereof, is supplied to the front blowout port F33, and is blown out from the front blowout port F33 toward the passenger seat.

The rest of the conditioned air A, that is, the conditioned air A that has not come into contact with the fin body F36/1, flows toward the rear blowout port F32 side. Then, of the conditioned air A that has not come into contact with the fin body F36/1, the conditioned air flowing on the front blowout port F33 side of the duct body F30 comes into contact with a fin body F36/2 which is adjacent to the rear side of the fin body F36/1 and has a larger protruding length than the fin body F36/1, is guided by the fin body F36/2, is supplied to the front blowout port F33, and is blown out from the front blowout port F33 toward the passenger seat.

As described above, the conditioned air A flowing inside the duct body F30 is sequentially guided to the front blowout port F33 by the respective fin bodies F36 which are arranged in the axial direction. Meanwhile, of the conditioned air A flowing inside the duct body F30, the conditioned air flowing on the right side of the duct body F30, that is, the side opposite to the front blowout port F33, does not come into contact with the fin bodies F36, flows toward the rear blowout port F32 side as it is, and is blown out through the rear blowout port F32 toward the vehicle compartment rear portion. Accordingly, the conditioned air A flowing in the duct body F30, is distributed to the rear blowout port F32 and the front blowout port F33 by the fin member F35 provided inside the duct body F30. Therefore, even though the air conditioning function-equipped console device F1 according to Embodiment 1-1 includes the duct body F30 having a straight tubular shape, the conditioned air A is suitably distributed to both a flow path for general air-conditioning, that is, a flow path leading through the rear blowout port F32, and a flow path for proximity air-conditioning, that is, a flow path leading through the front blowout port F33.

As described above, the protruding lengths of the respective fin bodies F36 inside the duct body F30 gradually increase from the fin bodies F36 on the inflow port F31 side toward the fin bodies F36 on the rear blowout port F32 side, and the projected areas of the respective fin bodies F36 also gradually increase from the fin bodies F36 on the inflow port F31 side toward the fin bodies F36 on the rear blowout port F32 side. Therefore, out of the fin bodies F36, the fin bodies F36 on the rear blowout port F32 side come into contact with the conditioned air A flowing through a region away from the front blowout port F33 in the duct body F30.

The conditioned air A having come into contact with the fin bodies F36 on the rear blowout port F32 side is supplied to the region on the rear blowout port F32 side, in the front blowout port F33, to which a sufficient amount of the conditioned air A is less likely to be supplied. Therefore, in the air conditioning function-equipped console device according to Embodiment 1-1, a sufficient amount of the conditioned air A is supplied to the entire region of the front blowout port F33. Therefore, even though the front blowout port F33 has a shape extending along the axial direction of the duct body F30, that is, the flow path of the conditioned air A, the ununiformity of the amount of the conditioned air A supplied to the front blowout port F33 is reduced, and further, the ununiformity of the amount of the air-conditioning air blown out from the front blowout port F33 is reduced.

In the air conditioning function-equipped console device according to Embodiment 1-1, when the fin bodies F36 are at the second position (see FIG. 6), the flow path cross-sectional area of the duct F3 in the direction orthogonal to the axial direction, on the far side of the front blowout port F33, is about 50 area % of that when the fin bodies F36 are at the first position (see FIG. 7). Therefore, in the air conditioning function-equipped console device according to Embodiment 1-1, even when the fin bodies F36 open the front blowout port F33, a sufficient amount of the conditioned air A is also supplied to the rear blowout port F32, so that there is an advantage that both proximity air-conditioning and general air-conditioning are performed at the same time.

In the air conditioning function-equipped console device according to Embodiment 1-1, the length in the front-rear direction of the front blowout port F33 is about 50% of the length in the front-rear direction of the seat surface of the seat, and the length in the front-rear direction of the front blowout port F33 is about 10 times the length in the up-down direction thereof. In addition, the distance in the up-down direction between the upper end of the front blowout port F33 and the seat surface is about 150 mm. Accordingly, with the air conditioning function-equipped console device according to Embodiment 1-1, proximity air-conditioning is suitably performed.

Embodiment 2-1

Embodiment 2-1 is an embodiment of the air conditioning function-equipped console device according to the second aspect.

Figure 8:
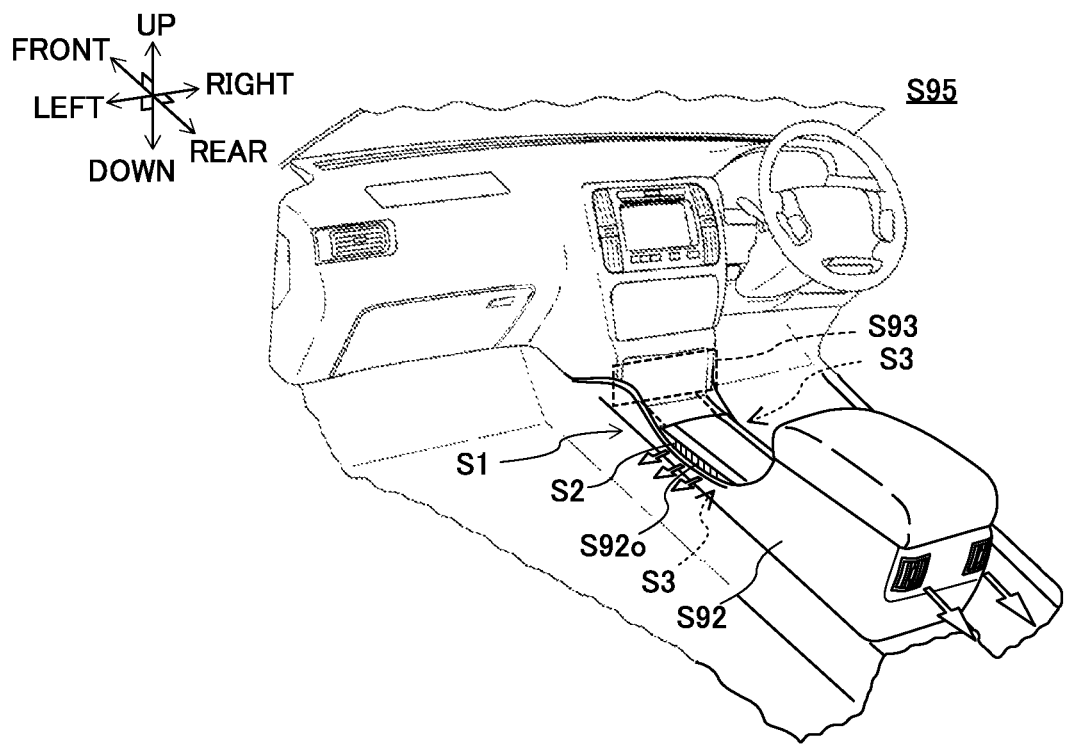
FIG. 8 schematically illustrates an air conditioning duct device according to Embodiment 2-1 in a vehicle compartment.
Figure 9:
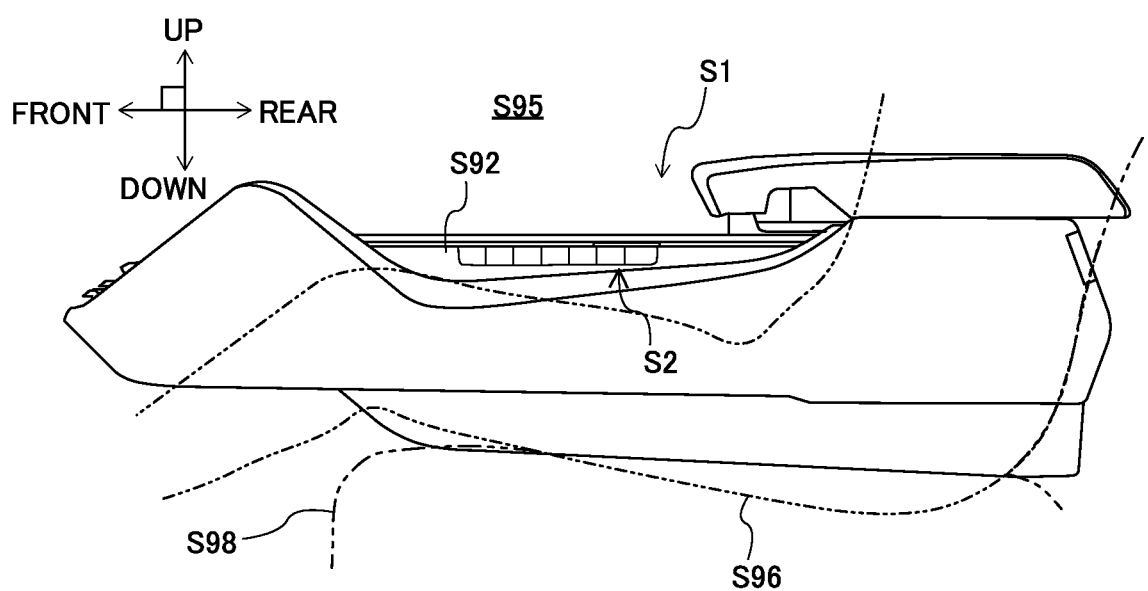
FIG. 9 illustrates the positional relationship between the air conditioning duct device according to Embodiment 2-1 and an occupant sitting on a seat.
Figure 10:
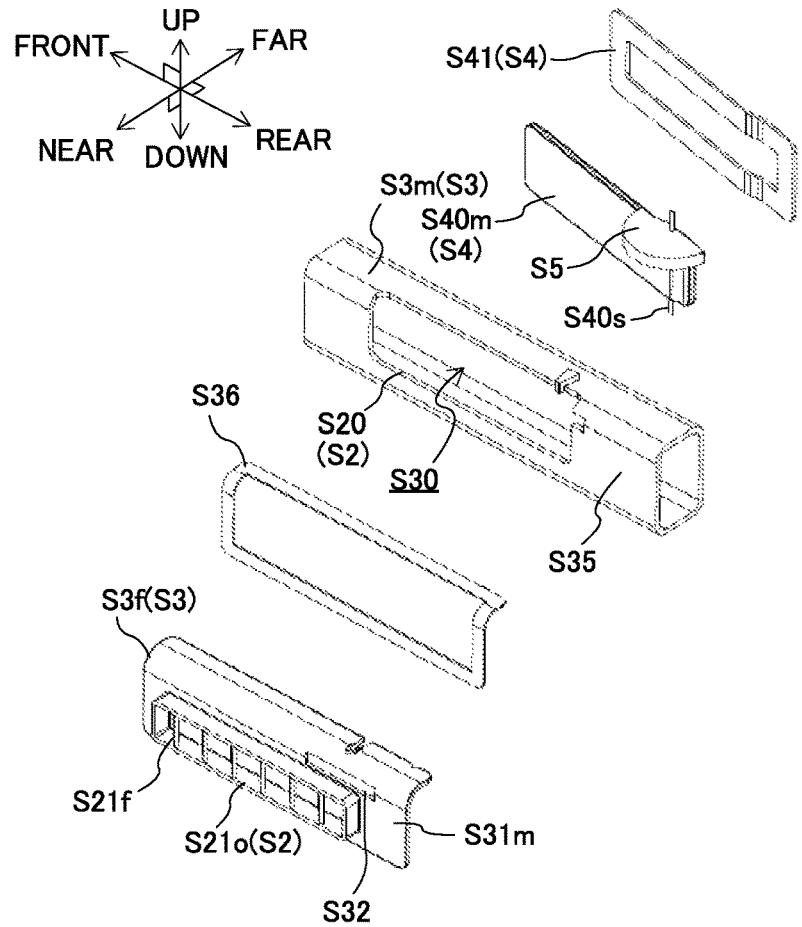
FIG. 10 schematically illustrates the air conditioning duct device according to Embodiment 2-1 in a disassembled state.
Figure 11:
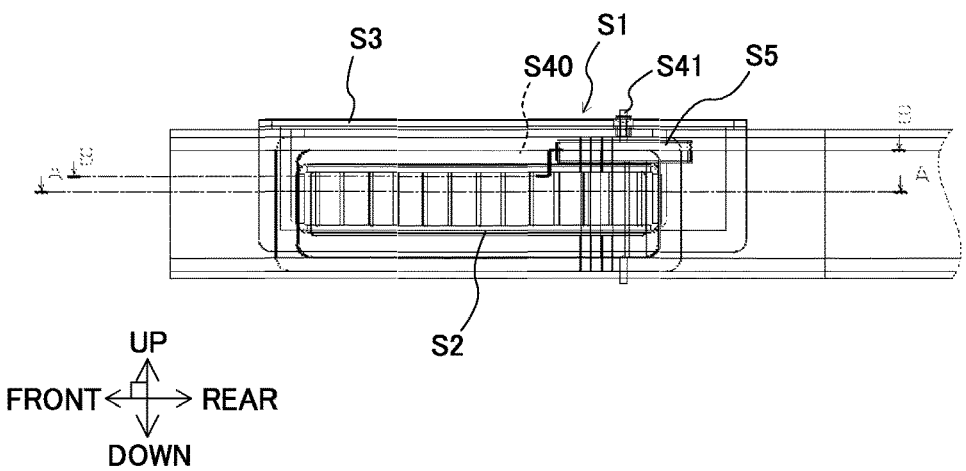
FIG. 11 schematically illustrates a view of the air conditioning duct device according to Embodiment 2-1 as seen from the inside of the vehicle compartment.
Figure 12:
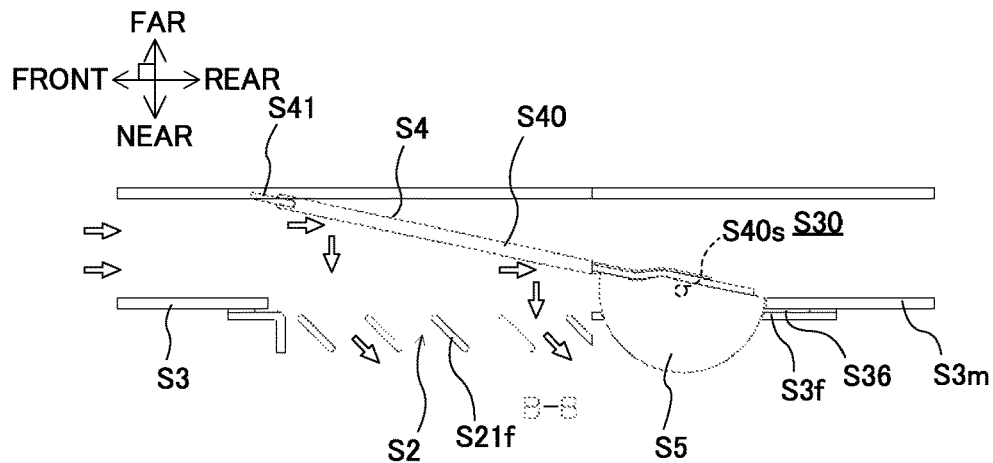
FIG. 12 schematically illustrates a cross-sectional view of the air conditioning duct device according to Embodiment 2-1 taken at a position B-B in FIG. 11.
Figure 13:
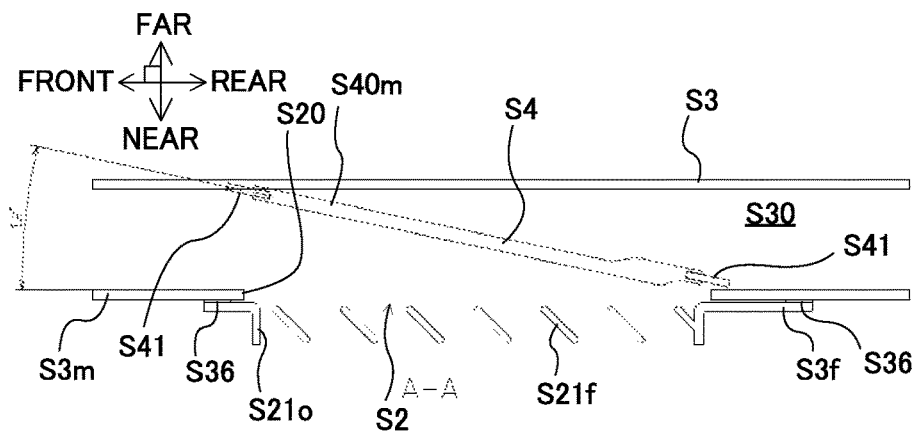
FIG. 13 schematically illustrates a cross-sectional view of the air conditioning duct device according to Embodiment 2-1 taken at a position A-A in FIG. 11.
Figure 14:
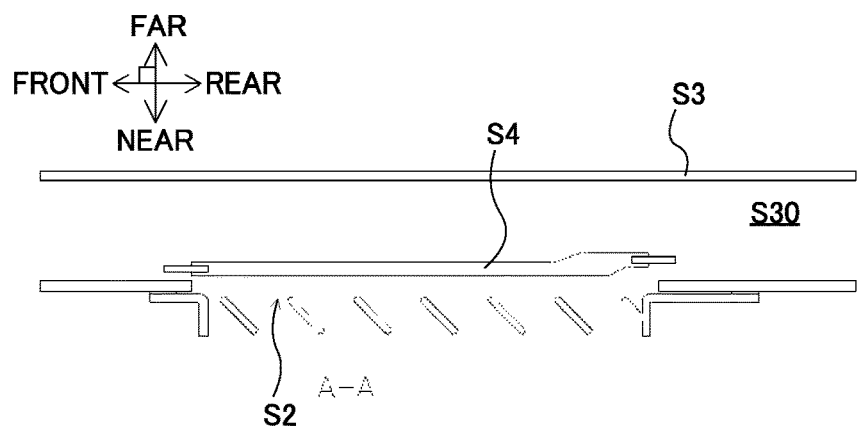
FIG. 14 schematically illustrates a cross-sectional view of the air conditioning duct device according to Embodiment 2-1 taken at the position A-A in FIG. 11.

FIG. 8 schematically illustrates an air conditioning duct device according to Embodiment 2-1 in a vehicle compartment. FIG. 9 illustrates the positional relationship between the air conditioning duct device according to Embodiment 2-1 and an occupant sitting on a seat. FIG. 10 schematically illustrates the air conditioning duct device according to Embodiment 2-1 in a disassembled state. FIG. 11 schematically illustrates a view of the air conditioning duct device according to Embodiment 2-1 as seen from the inside of the vehicle compartment. FIG. 12 schematically illustrates a cross-sectional view of the air conditioning duct device according to Embodiment 2-1 taken at a position B-B in FIG. 11. FIG. 13 and FIG. 14 each schematically illustrate a cross-sectional view of the air conditioning duct device according to Embodiment 2-1 taken at a position A-A in FIG. 11. FIG. 13 shows a state where a damper is in an opened state, and FIG. 14 shows a state where the damper is in a closed state.

Hereinafter, upper, lower near, far, front, and rear mean up, down, near, far, front, and rear in each drawing. Upper and lower mean the upper side and the lower side in the vertical direction, and front and rear mean the front and the rear in the traveling direction of a vehicle. The near-far direction coincides with the width direction of the vehicle.

As shown in FIG. 8, an air conditioning duct device S1 according to Embodiment 2-1 is disposed in a vehicle compartment S95 and mounted on a center console box S92 of the vehicle. The center console box S92 is disposed between a passenger seat S98 (see FIG. 9) and a driver seat (not shown) both of which are front seats.

The air conditioning duct device S1 is disposed inside the center console box S92.

An opening S92o is provided in a side wall of the center console box S92, and a blowout port S2 of the air conditioning duct device S1 described later is located at a position corresponding to the opening S92o.

As shown in FIG. 10, the air conditioning duct device S1 includes a duct S3, the blowout port S2, a damper S4, and an operation portion S5.

The duct S3 includes a duct body S3m, an opening frame S3f, and a first seal S36.

The duct body S3m has a straight tubular shape extending in the front-rear direction. The opening frame S3f has a substantially plate shape, is integrated with the duct body S3m, and covers a peripheral wall S35 of the duct body S3m from the outside.

As shown in FIG. 8, a front end portion of the duct S3 is connected to the downstream side of a vehicle air conditioner S93 which is disposed on the front side of the center console box S92.

An interior S30 of the duct body S3m shown in FIG. 10 is a flow path of conditioned air supplied by the vehicle air conditioner S93, and in this flow path, the upstream side is the front side, and the downstream side is the rear side. The upstream-downstream direction is also considered to coincide with the traveling direction of the vehicle. The interior S30 of the duct body S3m is also the interior of the duct S3.

A duct window portion S20 is provided in the peripheral wall S35 of the duct body S3m so as to provide communication between the interior S30 of the duct body S3m and the outside. The duct window portion S20 has a long shape, and has a long-side direction directed in the front-rear direction and a short-side direction directed in the up-down direction.

The opening frame S3f includes a frame body S31m having a substantially plate shape, and a tubular frame window portion S21o protruding from the frame body S31m toward the near side.

The interior of the frame window portion S21o has a window shape that penetrates the frame body S31m in the near-far direction. In addition, the interior of the frame window portion S21o has a long shape corresponding to the duct window portion S20 and slightly larger than the duct window portion S20.

A plurality of fin portions S21f are mounted inside the frame window portion S21o. Each fin portion S21f has a substantially plate shape, and the fin portions S21f are arranged in the long-side direction of the frame window portion S21o, that is, the front-rear direction.

An operation window portion S32 having a long shape is provided on the upper side of the frame window portion S21o. The operation window portion S32 has a long-side direction directed in the front-rear direction, and has a window shape that penetrates the frame body S31m in the near-far direction.

The frame body S31m covers the peripheral wall S35 of the duct body S3m from the near side with the frame window portion S21o facing the duct window portion S20.

In the air conditioning duct device S1 according to Embodiment 2-1, the interior of the duct window portion S20 and the interior of the frame window portion S21o form the blowout port S2 which provides communication between the interior S30 of the duct S3 and the vehicle compartment S95. The dimension of the blowout port S2 is substantially the inner dimension of the duct window portion S20. The opening length of the blowout port S2 in the long-side direction, that is, the front-rear direction, is about six times the opening length of the blowout port S2 in the short-side direction, that is, the up-down direction.

The first seal S36 is interposed between the opening frame S3f and the duct body S3m. The first seal S36 is elastically deformable, has a frame shape having a slightly larger inner dimension than the blowout port S2, seals the gap between the peripheral wall S35 of the duct body S3m and the frame body S31m of the opening frame S3f at a peripheral edge portion of the blowout port S2, and suppresses leakage of the conditioned air from the gap.

The damper S4 includes a damper body S40m, a second seal S41, and a rotation shaft S40s. The damper body S40m has a long plate shape corresponding to the shape of the blowout port S2, and has a long-side direction directed in the front-rear direction and a short-side direction directed in the up-down direction. The second seal S41 is elastically deformable, has a long frame shape having a slightly larger outer dimension than the damper body S40m, and covers the outer peripheral side of the damper body S40m. The dimension of the damper S4 is substantially the outer dimension of the second seal S41.

The rotation shaft S40s has an axial direction directed in the up-down direction, and is integrated with one end portion in the long-side direction of the damper body S40m, specifically, with a rear end portion of the damper body S40m.

The damper S4 is disposed in the interior S30 of the duct S3, and faces the blowout port S2 on the far side of the blowout port S2.

The operation portion S5 has a dial shape that is a substantially semi-disk shape, and has a long-side direction directed in the front-rear direction and the near-far direction. In other words, a straight line extending in the long-side direction of the operation portion S5 is coplanar with a straight line extending in the long-side direction of the blowout port S2 and a straight line extending in the near-far direction of the blowout port S2. The operation portion S5 is integrated with a rear portion of the damper body S40*m* on the upper side of the damper body S40*m*.

A far-side end portion of the operation portion S5 is located in the interior S30 of the duct S3 together with the damper S4. The operation portion S5 protrudes from the interior S30 of the duct S3 toward the near side. A near-side portion of the operation portion S5 is exposed to the outside of the duct body S3*m* through the duct window portion S20, and further exposed to the near side of the duct S3 through the operation window portion S32 of the opening frame S3*f*.

An upper end portion of the rotation shaft S40*s* of the damper S4 is pivotally supported by the duct body S3*m*, and a lower end portion of the rotation shaft S40*s* is pivotally supported by the center console box S92 on the near side of the peripheral wall S35 of the duct body S3*m*.

The damper S4 rotates about the rotation shaft S40*s*, and changes a state thereof between the opened state shown in FIG. 12 and FIG. 13 and the closed state shown in FIG. 14.

The protruding amount of the damper S4 into the duct S3 is larger in the opened state shown in FIG. 12 and FIG. 13 than in the closed state shown in FIG. 14.

In the air conditioning duct device S1 according to Embodiment 2-1, in the opened state, the damper S4 closes the interior S30 of the duct S3. Specifically, at this time, the damper S4 divides the interior S30 of the duct S3 from the front side, that is, the upstream side, and the far side, to the rear side, that is, the downstream side, and the near side, and guides the conditioned air to the blowout port S2.

At this time, the damper S4 is in a state of opening the blowout port S2, and the amount of the conditioned air supplied to the blowout port S2 is maximized.

As shown in FIG. 14, in the closed state, the damper S4 closes the blowout port S2. Accordingly, the conditioned air flows out to the rear side of the blowout port S2, that is, the downstream side of the duct S3. At this time, the amount of the conditioned air supplied to the blowout port S2 is minimized.

As shown in FIG. 10 and FIG. 11, the operation portion S5 in the air conditioning duct device S1 according to Embodiment 2-1 is disposed on the outer side in the short-side direction with respect to the blowout port S2, more specifically, on the upper side and the outer side of the blowout port S2. Therefore, the air conditioning duct device S1 according to Embodiment 2-1 is compact even though the outer shape of the operation portion S5 is large. In addition, since the outer shape of the operation portion S5 of is large, even though the damper S4 having a long shape and having a relatively large size is operated, the load applied to the operation portion S5 is sufficiently reduced. Accordingly, excellent operability is provided to the air conditioning duct device S1 according to Embodiment 2-1. That is, the air conditioning duct device S1 according to Embodiment 2-1 has excellent functionality.

Even in the case where the operation portion S5 is disposed on the lower side and the outer side of the blowout port S2, similar to the air conditioning duct device S1 according to Embodiment 2-1, the effect that the entirety of the air conditioning duct device S1 is made compact is achieved. However, if the blowout port S2 is a blowout port for proximity air-conditioning having a long-side direction directed in a horizontal direction as in the blowout port S2 in the air conditioning duct device S1 according to Embodiment 2-1, when the operation portion S5 is disposed on the upper side of the blowout port S2, there is an advantage that a user sitting on the seat is allowed to easily perform an operation of moving the operation portion S5. Also, in this case, the user is allowed to easily access the operation portion S5 without closing the blowout port S2 with their hand. Accordingly, also when moving the operation portion S5, supply of the conditioned air from the blowout port S2 to the thighs of the user is suitably maintained, so that there is an advantage that proximity air-conditioning is suitably continued.

For reference, in the air conditioning duct device S1 according to Embodiment 2-1, the length of the operation portion S5 in the front-rear direction is about 2/5 times the opening length of the blowout port S2 in the front-rear direction.

As shown in FIG. 9, the blowout port S2 faces the seat (passenger seat S98), and the conditioned air is blown to the thighs of an occupant S96 sitting on the seat. Therefore, the air conditioning duct device S1 according to Embodiment 2-1 serves as an air conditioning duct device for proximity air-conditioning. Although not shown, a downstream-side end portion of the duct S3 in the air conditioning duct device S1 according to Embodiment 2-1 is connected to an air conditioning duct device (not shown) for general air-conditioning. Therefore, the conditioned air having flowed out to the downstream side of the duct S3 is used for general air-conditioning.

Embodiment 2-2

Embodiment 2-2 is an embodiment of the air conditioning function-equipped console device according to the second aspect.

Figure 15:
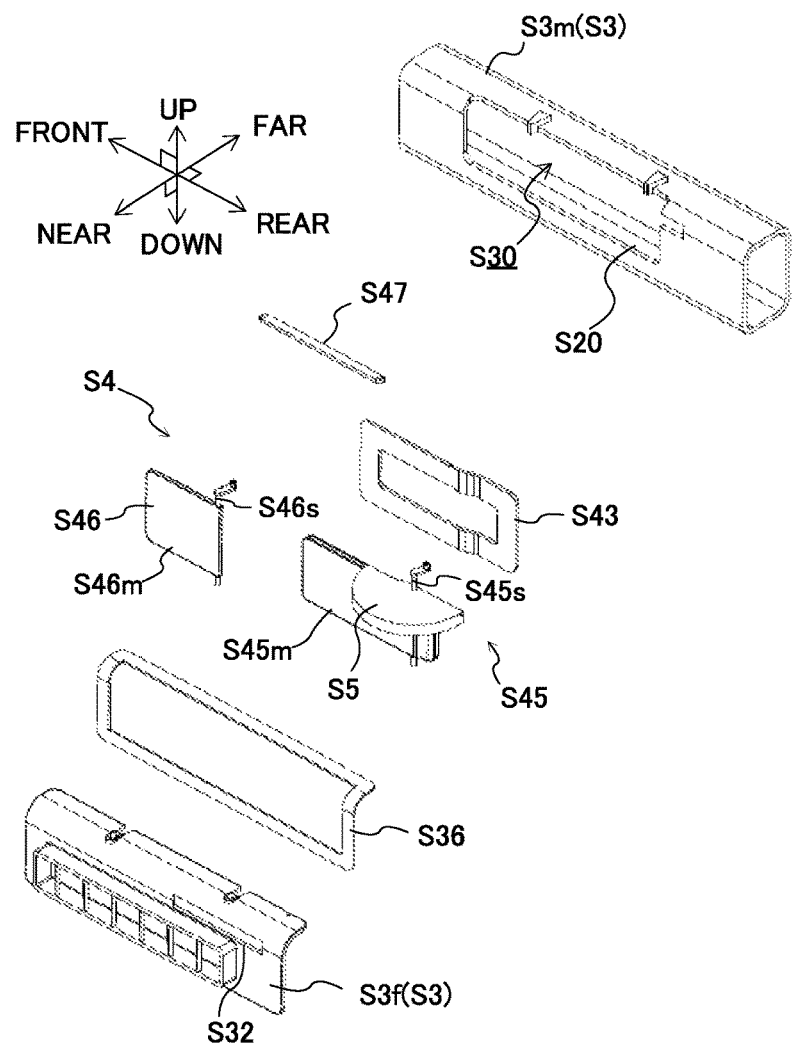
FIG. 15 schematically illustrates an air conditioning duct device according to Embodiment 2-2 in a disassembled state.
Figure 16:
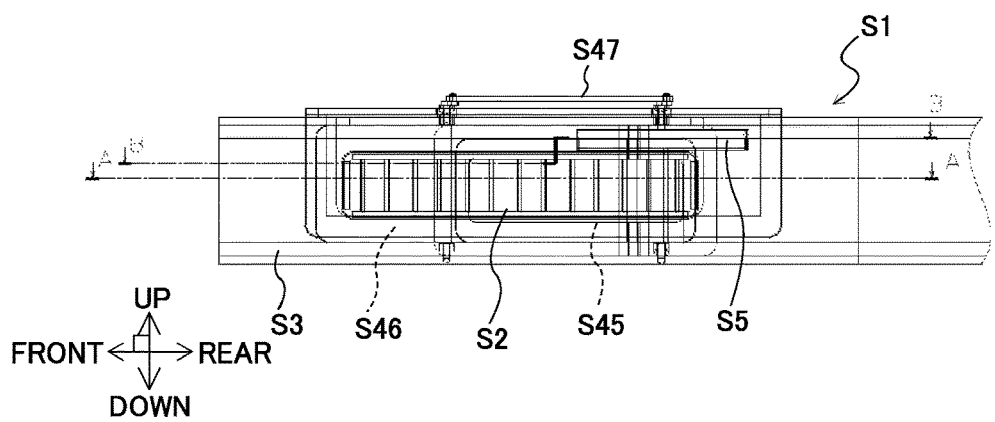
FIG. 16 schematically illustrates a view of the air conditioning duct device according to Embodiment 2-2 as seen from the inside of a vehicle compartment.
Figure 17:
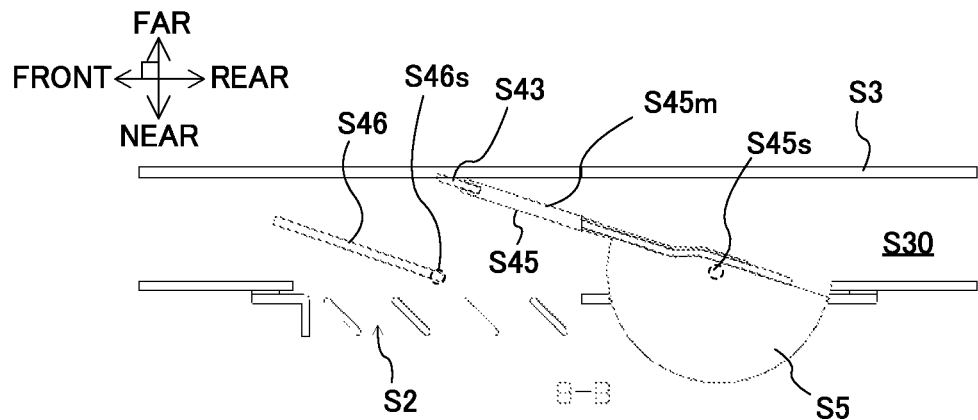
FIG. 17 schematically illustrates a cross-sectional view of the air conditioning duct device according to Embodiment 2-2 taken at a position B-B in FIG. 16.
Figure 18:
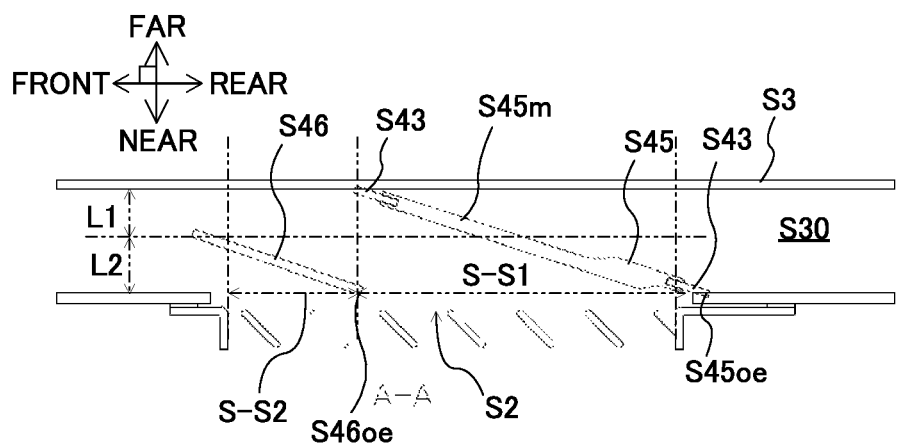
FIG. 18 schematically illustrates a cross-sectional view of the air conditioning duct device according to Embodiment 2-2 taken at a position A-A in FIG. 16.
Figure 19:
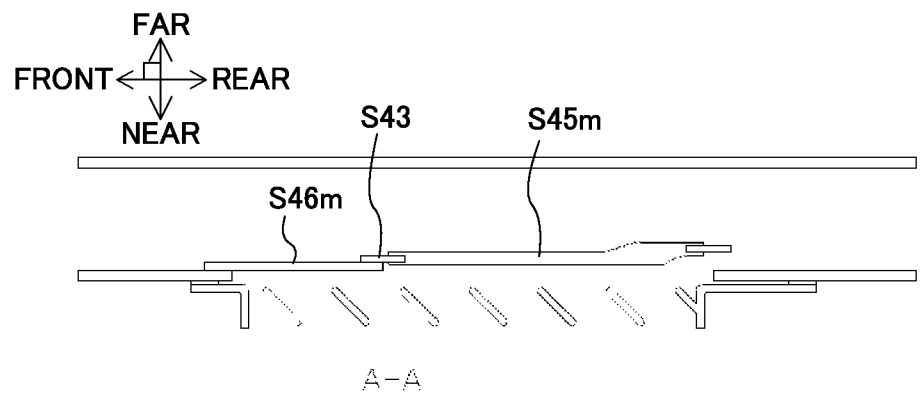
FIG. 19 schematically illustrates a cross-sectional view of the air conditioning duct device according to Embodiment 2-2 taken at the position A-A in FIG. 16.

An air conditioning duct device S1 according to Embodiment 2-2 is substantially the same as the air conditioning duct device S1 according to Embodiment 2-1, except that a damper is composed of two damper partial portions and a link member. FIG. 15 schematically illustrates the air conditioning duct device S1 according to Embodiment 2-2 in a disassembled state. FIG. 16 schematically illustrates a view of the air conditioning duct device according to Embodiment 2-2 as seen from the inside of the vehicle compartment. FIG. 17 schematically illustrates a cross-sectional view of the air conditioning duct device according to Embodiment 2-2 taken at a position B-B in FIG. 16. FIG. 18 and FIG. 19 each schematically illustrate a cross-sectional view of the air conditioning duct device according to Embodiment 2-2 taken at a position A-A in FIG. 16. FIG. 18 shows a state where the damper is in an opened state, and FIG. 19 shows a state where the damper is in a closed state.

Hereinafter, the air conditioning duct device S1 according to Embodiment 2-2 is described focusing on the differences from the air conditioning duct device S1 according to Embodiment 2-1.

As shown in FIG. 15, a damper S4 in the air conditioning duct device S1 according to Embodiment 2-2 includes a first damper partial portion S45, a second damper partial portion S46, and a link member S47.

The first damper partial portion S45 includes a first damper body S45*m*, a third seal S43, and a first rotation shaft S45*s*. The first damper body S45*m* has a substantially plate shape, and has a long-side direction directed in the front-rear direction and a short-side direction directed in the up-down direction. The third seal S43 is elastically deformable, has a long frame shape having a slightly larger outer dimension than the first damper body S45*m*, and covers the outer peripheral side of the first damper body S45*m*. The dimension of the first damper partial portion S45 is substantially the outer dimension of the third seal S43.

The first rotation shaft S45*s* has an axial direction directed in the up-down direction, and is integrated with one end portion in the long-side direction of the first damper body S45m, specifically, with a rear end portion of the first damper body S45m.

The second damper partial portion S46 includes a second damper body S46m and a second rotation shaft S46s. The second damper body S46m has a substantially plate shape, and has a long-side direction directed in the front-rear direction and a short-side direction directed in the up-down direction. The second rotation shaft S46s has an axial direction directed in the up-down direction, and is integrated with one end portion in the long-side direction of the second damper body S46m, specifically, with a rear end portion of the second damper body S46m.

The second damper partial portion S46 and the first damper partial portion S45 are arranged in the front-rear direction, that is, the upstream-downstream direction. In other words, the second damper partial portion S46 is disposed on the upstream side, and the first damper partial portion S45 is disposed on the downstream side.

In the front-rear direction, the length of the first damper body S45m is larger than the length of the second damper body S46m. In addition, in the up-down direction, the length of the first damper body S45m is substantially equal to the length of the second damper body S46m. The first damper body S45m and the second damper body S46m each have a shape obtained by roughly dividing the damper body S40m in the air conditioning duct device S1 according to Embodiment 2-1 into two parts.

An upper portion of the first rotation shaft S45s of the first damper partial portion S45 and an upper portion of the second rotation shaft S46s of the second damper partial portion S46 extend toward the far side.

The link member S47 has a long rod shape and pivotally supports both the upper portion of the first rotation shaft S45s and the upper portion of the second rotation shaft S46s. Accordingly, the first damper partial portion S45 and the second damper partial portion S46 synchronously rotate.

The operation portion S5 in the air conditioning duct device S1 according to Embodiment 2-2 has a dial shape that is substantially the same as that of the operation portion S5 in the air conditioning duct device S1 according to Embodiment 2-1, and, similar to the operation portion S5 in the air conditioning duct device S1 according to Embodiment 2-1, has a long-side direction directed in the front-rear direction and the near-far direction. The operation portion S5 is integrated with a rear portion of the first damper body S45m on the upper side of the first damper body S45m.

The operation portion S5 protrudes from the interior S30 of the duct S3 toward the near side. A near-side portion of the operation portion S5 is exposed to the outside of the duct body S3m through the duct window portion S20, and further exposed to the near side of the duct S3 through the operation window portion S32 of the opening frame S3f.

The first damper partial portion S45 rotates about the first rotation shaft S45s, and changes a state thereof between the opened state shown in FIG. 17 and FIG. 18 and the closed state shown in FIG. 19.

The second damper partial portion S46 rotates about the second rotation shaft S46s, and changes a state thereof between the opened state shown in FIG. 17 and FIG. 18 and the closed state shown in FIG. 19.

When the first damper partial portion S45 and the second damper partial portion S46 come into the opened state, the damper S4 itself also comes into the opened state. Similarly, when the first damper partial portion S45 and the second damper partial portion S46 come into the closed state, the damper S4 itself also comes into the closed state.

The protruding amount of the first damper partial portion S45 into the duct S3 is larger in the opened state shown in FIG. 17 and FIG. 18 than in the closed state shown in FIG. 19. In addition, the protruding amount of the second damper partial portion S46 into the duct S3 is larger in the opened state shown in FIG. 17 and FIG. 18 than in the closed state shown in FIG. 19.

More specifically, in the opened state shown in FIG. 18, the protruding amount of the first damper partial portion S45 into the duct S3, that is, the protruding length (L1+L2) of the first damper partial portion S45 toward the far side of the blowout port S2, is twice the protruding amount of the second damper partial portion S46 into the duct S3, that is, the protruding length (L2) of the second damper partial portion S46 toward the far side of the blowout port S2. The length in the near-far direction of the interior S30 of the duct S3 is equal to the protruding length (L1+L2) of the first damper partial portion S45 toward the far side of the blowout port S2. Therefore, the protruding length (L2) of the second damper partial portion S46 toward the far side of the blowout port S2 is considered to be 1/2 of the length (L1+L2) in the near-far direction of the interior S30 of the duct S3.

Also, in the opened state shown in FIG. 18, a downstream-side end portion of the first damper partial portion S45, that is, a blowout-side end portion S45oe of the first damper partial portion S45, is located at a position close to the blowout port S2. Similarly, a downstream-side end portion of the second damper partial portion S46, that is, a blowout-side end portion S46oe of the second damper partial portion S46, is located at a position close to the blowout port S2. More specifically, the distance between the blowout-side end portion S45oe and the blowout port S2 and the distance between the blowout-side end portion S46oe and the blowout port S2 are substantially 0 mm.

Accordingly, the first damper partial portion S45 and the second damper partial portion S46 divide a flow path of conditioned air leading from the interior S30 of the duct S3 to the blowout port S2.

More specifically, in the opened state, the first damper partial portion S45 and the second damper partial portion S46 divide the blowout port S2 into two regions in the upstream-downstream direction thereof. One of the two regions is referred to as a first blowout region, and the other of the two regions is referred to as a second blowout region. The second blowout region is a region formed on the upstream side of the second damper partial portion S46, and the first blowout region is a region formed on the downstream side of the second damper partial portion S46. In the air conditioning duct device S1 according to Embodiment 2-2, the first blowout region is located on the downstream side of the second blowout region, and an opening area S-S1 of the first blowout region is twice an opening area S-S2 of the second blowout region. In addition, in the air conditioning duct device S1 according to Embodiment 2-2, the opening height of the blowout port S2 is uniform in the long-side direction thereof, so that the opening width of the first blowout region is considered to be twice the opening width of the second blowout region.

In the air conditioning duct device S1 according to Embodiment 2-2, since the damper S4 is divided into the first damper partial portion S45 and the second damper partial portion S46, the size of each damper partial portion (the first damper partial portion S45, the second damper partial portion S46) is reduced, and an operating load for changing the state of the damper S4 is reduced. In addition, since the operation portion S5 is disposed on the outer side in the short-side direction with respect to the blowout port S2, the air conditioning duct device S1 is made compact with the outer shape of the operation portion S5 being made sufficiently large, and the load applied to the operation portion S5 is sufficiently reduced. Accordingly, excellent operability is provided to the air conditioning duct device S1 according to Embodiment 2-2.

Also, in the air conditioning duct device S1 according to Embodiment 2-2, since the protruding amounts of the first damper partial portion S45 and the second damper partial portion S46 are in the above ranges and the opening areas of the first blowout region and the second blowout region have the above ratio, the amount of the conditioned air supplied to the blowout port S2 having a long shape is made substantially uniform in the long-side direction of the blowout port S2. Accordingly, in the air conditioning duct device S1 according to Embodiment 2-2, the ununiformity of the amount of the conditioned air blown out from the blowout port having a long shape is eliminated or reduced.

Owing to collaboration of the above, the air conditioning duct device S1 according to Embodiment 2-2 exhibits very excellent functionality.

In the air conditioning duct device S1 according to Embodiment 2-2, when the damper S4 is in the closed state shown in FIG. 19, the gap between the first damper partial portion S45 and the second damper partial portion S46 is sealed by the third seal S43.

The present invention is not limited to the embodiments described above and shown in the drawings, but may be modified as appropriate without deviating from the gist of the present invention. Furthermore, components described in the present specification including the embodiments may be optionally extracted and combined to be implemented.

The invention claimed is:

1. An air conditioning function-equipped console device comprising:
   a housing having an internal space and disposed on a lateral side of a seat of a vehicle; and
   a duct assembled to the housing and disposed in the internal space, wherein
   the duct includes a duct body and a fin member including a plurality of fin bodies and disposed inside the duct body,
   the duct body has a straight tubular shape having an inflow port located at one end portion thereof on a front side in a traveling direction of the vehicle and communicating with a vehicle air conditioner and a rear blowout port located at another end portion thereof on a rear side in the traveling direction of the vehicle and facing the rear side in the traveling direction of the vehicle, and having a front blowout port provided between the inflow port and the rear blowout port, extending in an axial direction of the duct body, and facing the seat,
   the fin member faces the front blowout port,
   the respective fin bodies are arranged in the axial direction, and
   projected areas of the respective fin bodies when projected in the axial direction increase from a fin body that is closest to the inflow port toward a fin body that is closest to the rear blowout port.

2. The air conditioning function-equipped console device according to claim 1, wherein protruding lengths of the fin bodies inside the duct body increase from the fin body that is closest to the inflow port toward the fin body that is closest to the rear blowout port side.

3. The air conditioning function-equipped console device according to claim 1, wherein the fin bodies synchronously rotate between a first position at which the projected areas thereof are minimized and a second position at which the projected areas thereof are maximized.

4. The air conditioning function-equipped console device according to claim 3, wherein a flow path cross-sectional area of the duct in a direction orthogonal to the axial direction on a far side of the front blowout port when the fin bodies are at the second position is not less than 20 area % of that when the fin bodies are at the first position.

* * * * *